United States Patent
Mori

(10) Patent No.: US 9,575,679 B2
(45) Date of Patent: Feb. 21, 2017

(54) STORAGE SYSTEM IN WHICH CONNECTED DATA IS DIVIDED

(71) Applicant: NEC Corporation, Minato-ku, Tokyo (JP)

(72) Inventor: Kenji Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 310 days.

(21) Appl. No.: 14/198,832

(22) Filed: Mar. 6, 2014

(65) Prior Publication Data

US 2014/0258654 A1    Sep. 11, 2014

(30) Foreign Application Priority Data

Mar. 6, 2013  (JP) ................................. 2013-044215

(51) Int. Cl.
*G06F 5/00* (2006.01)
*G06F 3/06* (2006.01)

(52) U.S. Cl.
CPC ............. *G06F 3/0641* (2013.01); *G06F 3/061* (2013.01); *G06F 3/0608* (2013.01); *G06F 3/0656* (2013.01); *G06F 3/0689* (2013.01)

(58) Field of Classification Search
None
See application file for complete search history.

(56) References Cited

U.S. PATENT DOCUMENTS 8,234,468 B1 *  7/2012  Deshmukh .......... G06F 11/1453
                                                 711/162

FOREIGN PATENT DOCUMENTS

JP         2005-235171 A        9/2005

OTHER PUBLICATIONS

Microsoft Computer Dictionary; 2002; Microsoft Press; Fifth Edition; p. 499.*

* cited by examiner

*Primary Examiner* — Idriss N Alrobaye
*Assistant Examiner* — Richard B Franklin

(57) ABSTRACT

For the purpose of suppressing decrease of a deduplication rate in a storage system, a storage system according to the present invention includes: a data buffer; a dividing unit configured to generate divided data by dividing data inputted into the data buffer; and a storage processing unit configured to store the divided data into a storage device while eliminating duplicate storage. The dividing unit is configured to generate the divided data by dividing the data inputted into the data buffer by a preset division standard based on the content of the data and also divide, by the division standard, connected data that residual data being left without being divided by the division standard and continuing data continuing to the residual data and being inputted in the data buffer are connected.

6 Claims, 28 Drawing Sheets

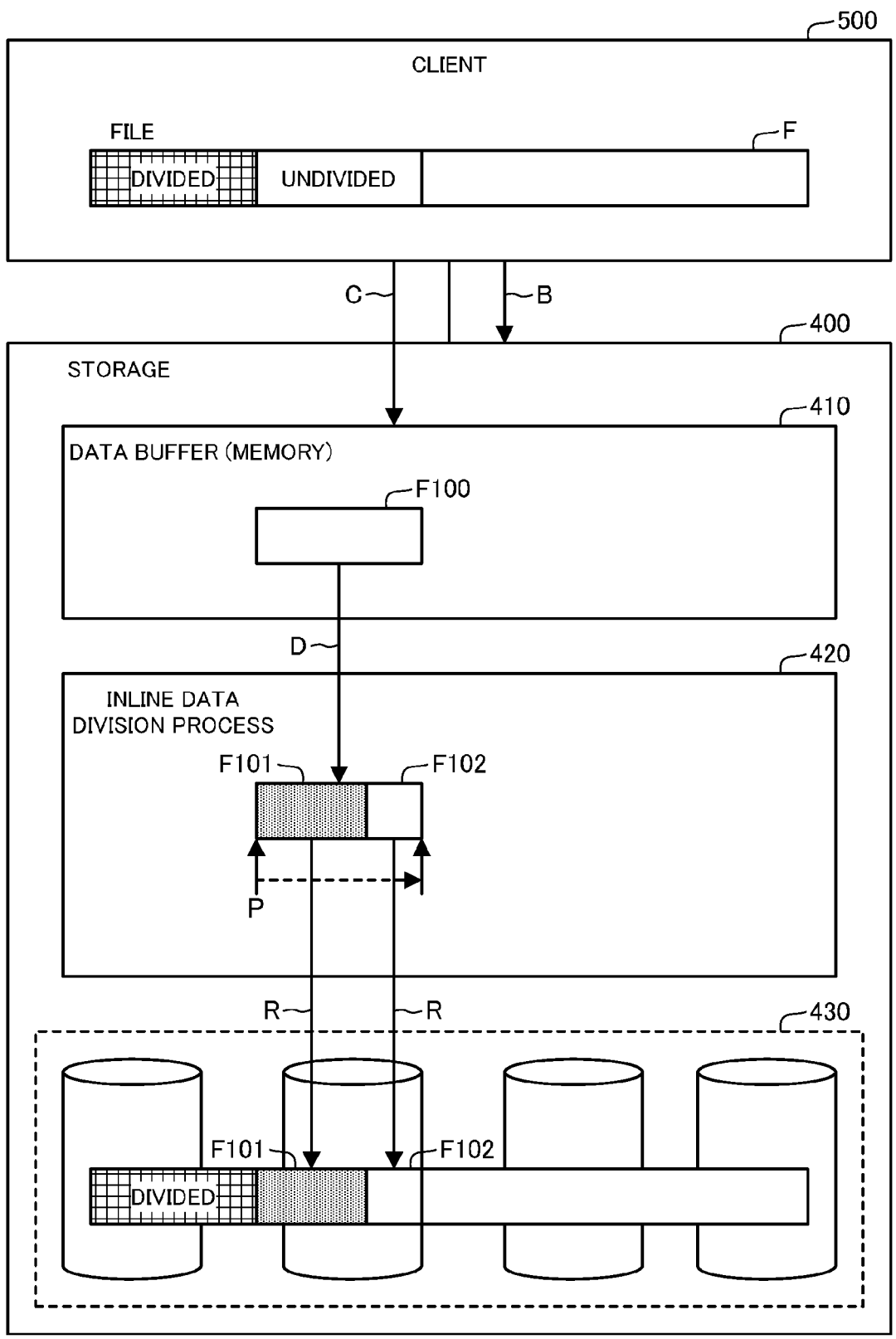

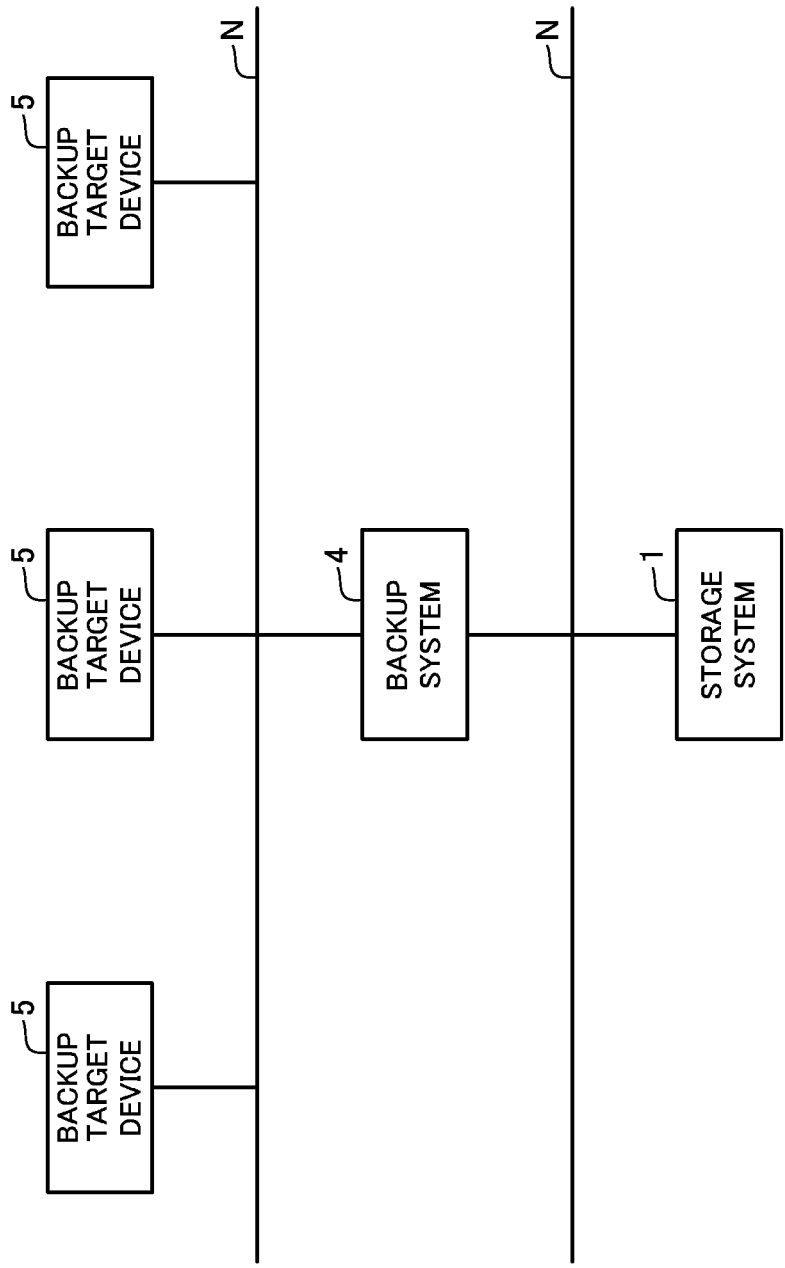

Fig.6

DATA BUFFER MANAGEMENT TABLE

| FILE NAME | file01 | | | |
|---|---|---|---|---|
| DATA BUFFER ADDRESS | address | | | |
| DATA BUFFER SIZE | size | | | |
| FILE OFFSET | DATA LENGTH | NUMBER OF DIVIDED DATA | UNDIVIDED DATA FLAG | DATA ADDRESS |
| offset1 | L1 | 0 | 1B | address1 |
| offset2 | L2 | 2 | 0B | address1 |
| NOT SET | NOT SET | NOT SET | NOT SET | NOT SET |
| ... | ... | ... | ... | ... |
| NOT SET | NOT SET | NOT SET | NOT SET | NOT SET |

Fig.7

DATA DIVISION POINT MANAGEMENT TABLE

| FILE NAME | file01 | | |
|---|---|---|---|
| FILE OFFSET | DATA LENGTH | finger print VALUE | CONTENT ADDRESS |
| offsetA | LA | FPA | CAA |
| offsetB | LB | FPB | CAB |
| offsetC | LC | FPC | CAC |
| ... | ... | ... | ... |
| NOT SET | NOT SET | NOT SET | NOT SET |

Fig.8

POST-PROCESS DATA DIVISION TARGET REGION MANAGEMENT TABLE

| FILE NAME | REDIVISION STARTING OFFSET | REDIVISION ENDING OFFSET |
|---|---|---|
| file01 | offsetX | offsetY |

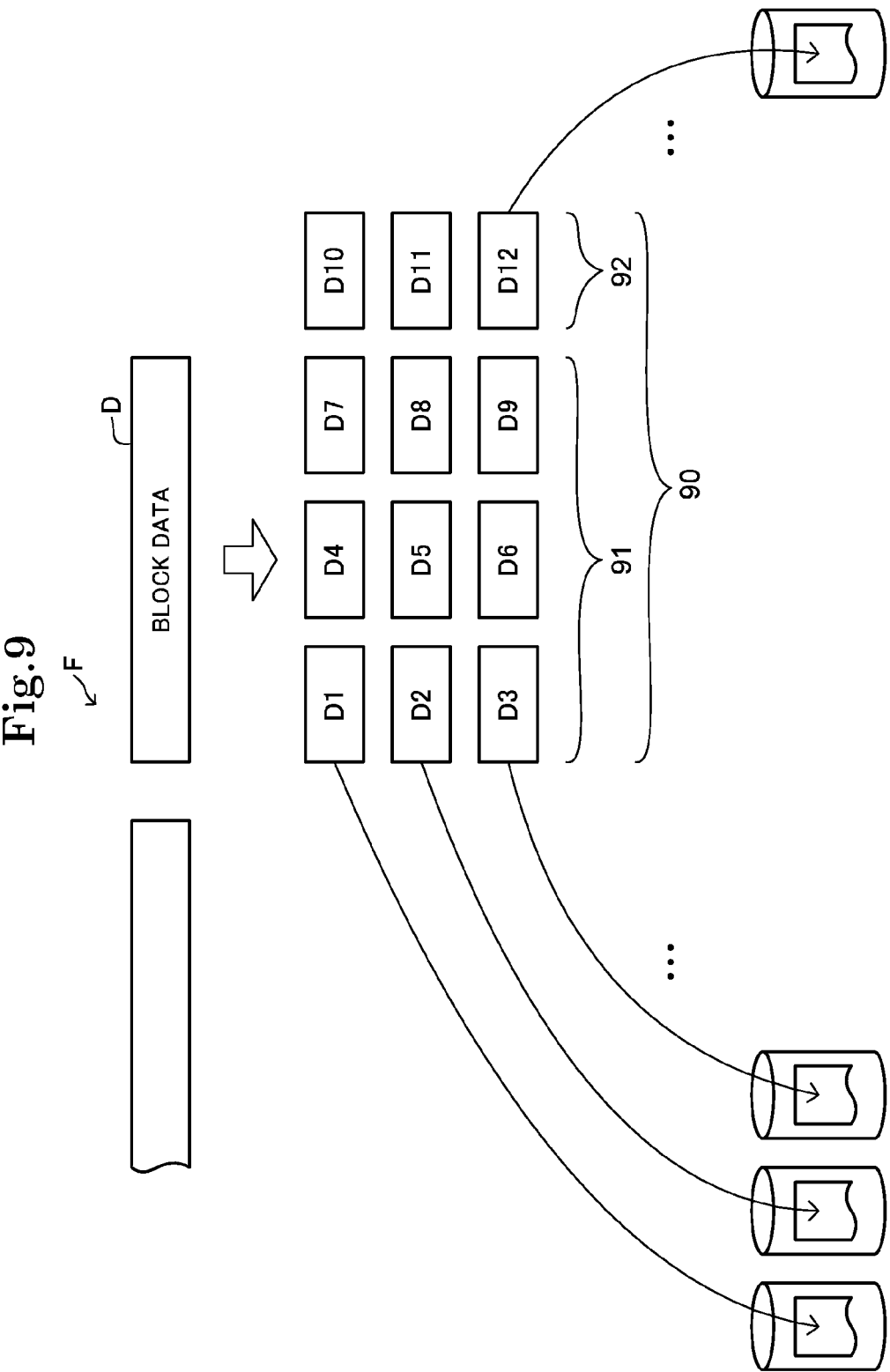

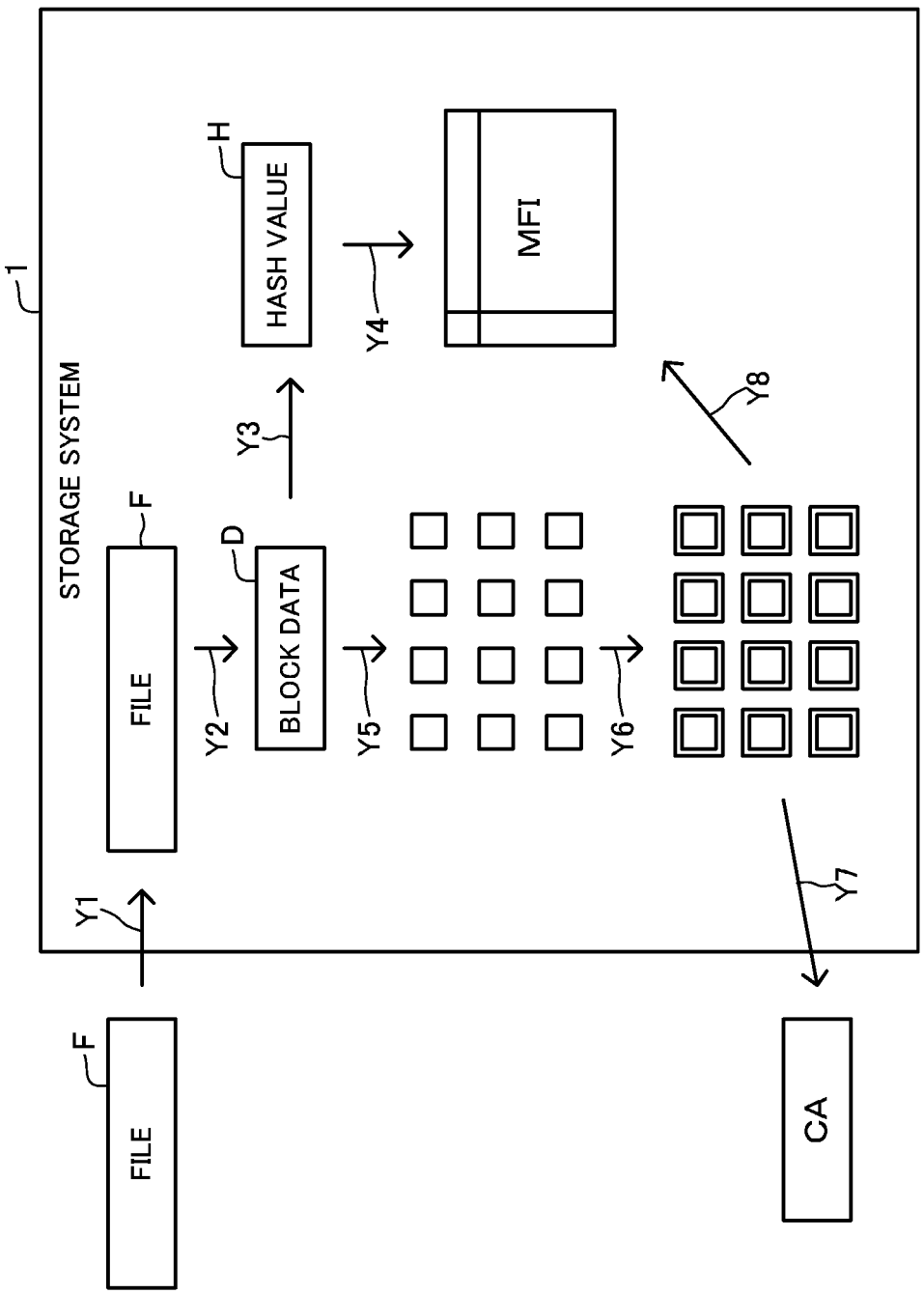

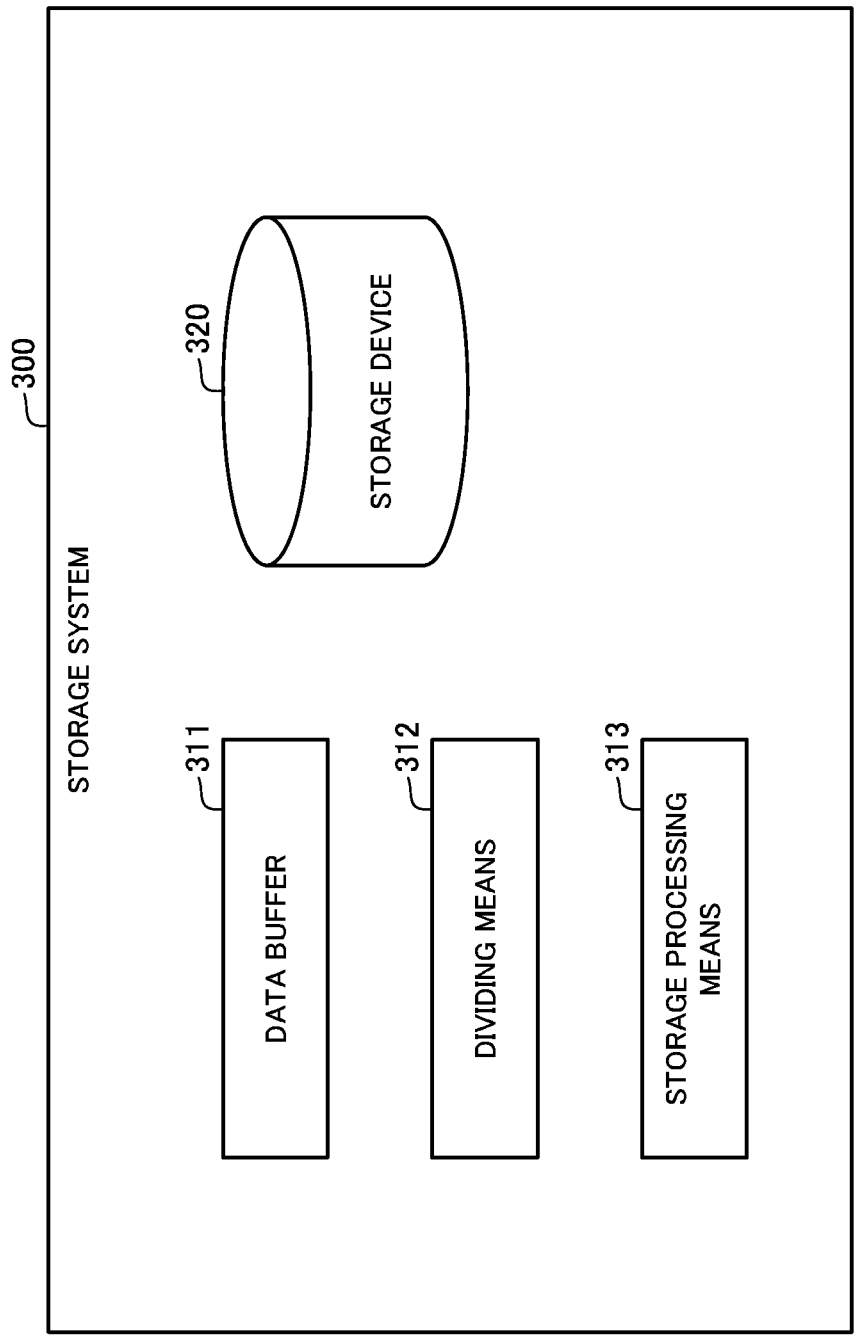

STORAGE SYSTEM IN WHICH CONNECTED DATA IS DIVIDED

INCORPORATION BY REFERENCE

This application is based upon and claims the benefit of priority from Japanese patent application No. 2013-044215, filed on Mar. 6, 2013, the disclosure of which is incorporated herein in its entirety by reference.

TECHNICAL FIELD

The present invention relates to a storage system, more specifically, relates to a storage system which eliminates duplicate storage of data of the same content.

BACKGROUND ART

In accordance with development and spread of computers in recent years, various kinds of information are digitalized. A device for storing such digital data is, for example, a storage device such as a magnetic tape and a magnetic disk. Because data to be stored increases day by day and reaches a huge amount, a mass storage system is required. Moreover, it is required to keep reliability while reducing the cost spent for a storage device. In addition, it is also required to be capable of easily retrieving data later. Thus, a storage system is expected to be capable of automatically realizing increase of storage capacity and performance, eliminating duplicate storage to reduce storage cost, and working with high redundancy.

Under such circumstances, a content-addressable storage system has been developed in recent years as shown in Patent Document 1. In this content-addressable storage system, data is distributed and stored into a plurality of storage devices, and a storage location where the data is stored is specified by a unique content address specified depending on the content of the data. Some content-addressable storage systems divide predetermined data into a plurality of fragments and store the fragments, together with fragments to become redundant data, into a plurality of storage devices, respectively.

The content-addressable storage system as described above can, by designation of a content address, retrieve data, namely, fragments stored in a storage location specified by the content address and restore the predetermined data before division by using the fragments later.

The content address is generated based on a value generated so as to be unique depending on the content of data, for example, based on the hash value of data. Thus, in a case where there is duplicate data, it is possible to acquire data of the same content by referring to data in the same storage location. Therefore, it is unnecessary to store separately the duplicate data, and it is possible to eliminate duplicate recording and reduce the volume of data.

In particular, a storage system which has a function of eliminating duplicate storage as described above compresses data to be written, such as a file, by dividing into a plurality of block data of predetermined volume and then writes into storage devices. By thus eliminating duplicate storage in units of the block data obtained by dividing a file, a duplication rate is increased and the volume of data is reduced.

For the best deduplication in the storage system as described above, it is optimum to compare all block data of all files and obtain the most duplicated block data. However, realization of such a process requires an extremely huge amount of calculation. Therefore, in division of data to be stored described above, a data variable division method using finger print is employed, for example. This method is a processing method of, at the time of storing data of similar content, calculating a finger print value from the beginning of the data so that the same place in the data becomes a data division point, and dividing the data at a place having a specified finger print value. Such a method of dividing data by using a finger print value has a merit that it requires a small amount of calculation, but has a problem that, if a division point is improper, a data deduplication rate at and after the point becomes low.

On the other hand, with regard to timing for data division, there are two methods. One is the post-process method of once writing all data onto a disk and then executing data division from the beginning of a file. The other is the inline method of executing data division in real time when writing data onto a disk. According to the post-process method, data division is executed after all data are written in, so that it is possible to execute data division with stability. However, the post-process method has a problem that load on a disk is high because the number of times of I/O of the disk is three times that of the inline method. Therefore, many products employ the inline method.

[Patent Document 1] Japanese Unexamined Patent Application Publication No. JP-A 2005-235171

However, a storage system which divides data by the inline method described above has a problem that a deduplication rate becomes low because, when a sequence of data writing from a client changes, a division point of data at the time of data writing onto a disk changes. Change of the data writing sequence is, for example, change of the order that a client sends data in a file to the storage, occurrence of a commit, and so on.

In particular, in a case where a commit occurs during data backup, there is a need to write data transmitted from a client to the storage system onto physical disks at the moment, so that the beginning and the end of data existing on a data buffer at the time of occurrence of the commit are set as data division points, and the data is divided into block data and written in. Thus, data is divided regardless of a finger print value. Consequently, for example, data division points become different even when data of the same contents are backed up, so that it becomes more probable that the contents of divided block data are not considered to be identical, and a deduplication rate becomes lower.

Referring to FIGS. 1A to 2B, a specific example of the abovementioned problem will be described below. First, an example in FIGS. 1A and 1B shows an operation in a case where, while a client 500 is backing up a file F into a storage 400 (see arrow B), a commit occurs in a state that data F100 exists in a data buffer 410 as shown in FIG. 1A. When a commit occurs (see arrow C), the data F100 existing in the data buffer 410 at the moment is divided into block data F101 and block data F102 in an inline data division process 420 (see arrow D), and then, written as the block data F101 and the block data F102 onto physical disks 430 (see arrow R).

After that, as shown in FIG. 1B, in a case where a commit occurs again in a state that data F200 following the data F100 exists in the data buffer 410 (see arrow C), the data F200 is divided into block data F201 and block data F202 in the inline data division process 420 (see arrow D), and then, written as the block data F201 and the block data F202 onto the physical disks 430 (see arrow R).

In the above case, a division point P of the block data F102 is not a division point properly set with a finger print value but a point where the data is forcibly divided. Therefore, it is probable that block data F102, F201 and F202 are not data divided with an optimum finger print value.

Further, an example in FIGS. 2A and 2B shows an operation in a case where, while the client 500 is backing up a file F into the storage 400 (see arrow B), a commit occurs in a state that data F100 and data F200 that does not follow the data F100 and is separated therefrom exist in the data buffer 410 as shown in FIG. 2A. Such an example may occur in a case where data are transmitted and received between a client and the storage by using a protocol (e.g., NFS) which does not ensure that the order of writing file data is the offset order at the time of file backup.

When a commit occurs in the abovementioned state (see arrow C), the data F100 and the data F200 that exist in the data buffer 410 at the moment are divided into block data F101 and F102 and block data F201 to F204, respectively, in the inline data division process 420 (see arrow D), and then, written as the block data F101 and F102 and the block data F201 to F204 onto the physical disks 430, respectively (see arrow R).

After that, as shown in FIG. 2B, when a commit occurs again in a state that data F300 located between the data F100 and F200 exists in the data buffer 410 (see arrow C), the data F300 is then divided into block data F301 to F303 in the inline data division process 420 (see arrow D), and then, written as the block data F301 to F303 onto the physical disks 430 (see arrow R).

In the above case, a division point P of the block data F102 is not a division point properly set with a finger print value or the like but a point where the data is forcibly divided. Therefore, it is probable that the block data F102, F301 to F303, and F201 to F204 are not data divided with an optimum finger print value.

As described above, the storage system having the function of eliminating duplicate storage has a problem that a deduplication rate decreases due to change of division points of data even when data of the same content are backed up.

SUMMARY

Accordingly, an object of the present invention is to solve the abovementioned problem, decrease of a deduplication rate in a storage system having a function of eliminating duplicate storage.

A storage system as an exemplary embodiment of the present invention includes:

a data buffer configured to receive input of data to be stored of a predetermined volume and store the data temporarily;

a dividing unit configured to generate divided data by dividing the data inputted into the data buffer; and a storage processing unit configured to store the divided data obtained by division by the dividing unit into a storage device and, when storing other divided data of a content identical to that of the divided data already stored in the storage device into the storage device, eliminate duplicate storage by reference of the divided data already stored in the storage device as the other divided data.

The dividing unit is configured to, at preset timing, generate the divided data by dividing the data inputted into the data buffer by a preset division standard based on a content of the data, and also divide, by the division standard, connected data that residual data and continuing data are connected in the data buffer, the residual data being left without being divided by the division standard, and the continuing data continuing to the residual data and being inputted in the data buffer.

Further, a medium as another exemplary embodiment of the present invention is a non-transitory computer-readable medium storing a program including instructions for causing a storage device, which includes a data buffer configured to receive input of data to be stored of a predetermined volume and store the data temporarily, to realize:

a dividing unit configured to generate divided data by dividing the data inputted into the data buffer; and a storage processing unit configured to store the divided data obtained by division by the dividing unit into a storage device and, when storing other divided data of a content identical to that of the divided data already stored in the storage device into the storage device, eliminate duplicate storage by reference of the divided data already stored in the storage device as the other divided data, the program also including instructions for causing the storage device to realize that the dividing unit is configured to, at preset timing, generate the divided data by dividing the data inputted into the data buffer by a preset division standard based on a content of the data, and also divide, by the division standard, connected data that residual data and continuing data are connected in the data buffer, the residual data being left without being divided by the division standard, and the continuing data continuing to the residual data and being inputted in the data buffer.

Further, a data storage method as another exemplary embodiment of the present invention includes:

by a storage device including a data buffer configured to receive input of data to be stored of a predetermined volume and store the data temporarily:

executing a division process of generating divided data by dividing the data inputted into the data buffer; and storing the divided data into a storage device and, when storing other divided data of a content identical to that of the divided data already stored in the storage device into the storage device, eliminating duplicate storage by reference of the divided data already stored in the storage device as the other divided data, The division process is executed to, at preset timing, generate the divided data by dividing the data inputted into the data buffer by a preset division standard based on a content of the data, and also divide, by the division standard, connected data that residual data and continuing data are connected in the data buffer, the residual data being left without being divided by the division standard, and the continuing data continuing to the residual data and being inputted in the data buffer.

With the configurations as described above, the present invention enables increase of a deduplication rate in a storage system having a function of eliminating duplicate storage.

BRIEF DESCRIPTION OF DRAWINGS

FIG. 1A is a diagram showing an aspect when data is stored in a storage system relating to the present invention;

FIG. 3 is a block diagram showing an overall configuration of a system including a storage system according to a first exemplary embodiment of the present invention;

FIG. 6 is a diagram showing an example of data stored in the storage system disclosed in FIG. 5;

FIG. 7 is a diagram showing an example of data stored in the storage system disclosed in FIG. 5;

FIG. 8 is a diagram showing an example of data stored in the storage system disclosed in FIG. 5;

FIG. 9 is an explanation diagram for explaining an aspect of a data writing process in the storage system disclosed in FIG. 5;

FIG. 10 is an explanation diagram explaining an aspect of the data writing process in the storage system disclosed in FIG. 5;

FIG. 27 is a function block diagram showing the configuration of a storage system according to Supplementary Note 1 of the present invention.

EXEMPLARY EMBODIMENT

<First Exemplary Embodiment>

Referring to FIGS. 3 to 26, a first exemplary embodiment of the present invention will be described. FIGS. 3 to 8 are diagrams for explaining the configuration of a storage system. FIGS. 9 to 12B are diagrams showing an aspect of data when the data is written in the storage system. FIGS. 13 to 26 are flowcharts showing an operation of the storage system.

This exemplary embodiment shows a specific example of a storage system and so on described in Supplementary Notes described later. Below, a case where a storage system is configured by a plurality of server computers connected with each other will be described. However, a storage system according to the present invention is not limited to being configured by a plurality of computers, and may be configured by one computer.

[Configuration]

As shown in FIG. 3, a storage system 1 according to the present invention is connected with a backup system 4 controlling a backup process via a network N. The backup system 4 acquires backup target data (data to be stored) stored in a backup target device 5 connected via the network N, and requests the storage system 1 to store the data. Thus, the storage system 1 stores the backup target data that the storage system 1 is requested to store, for backup.

Figure 1B:
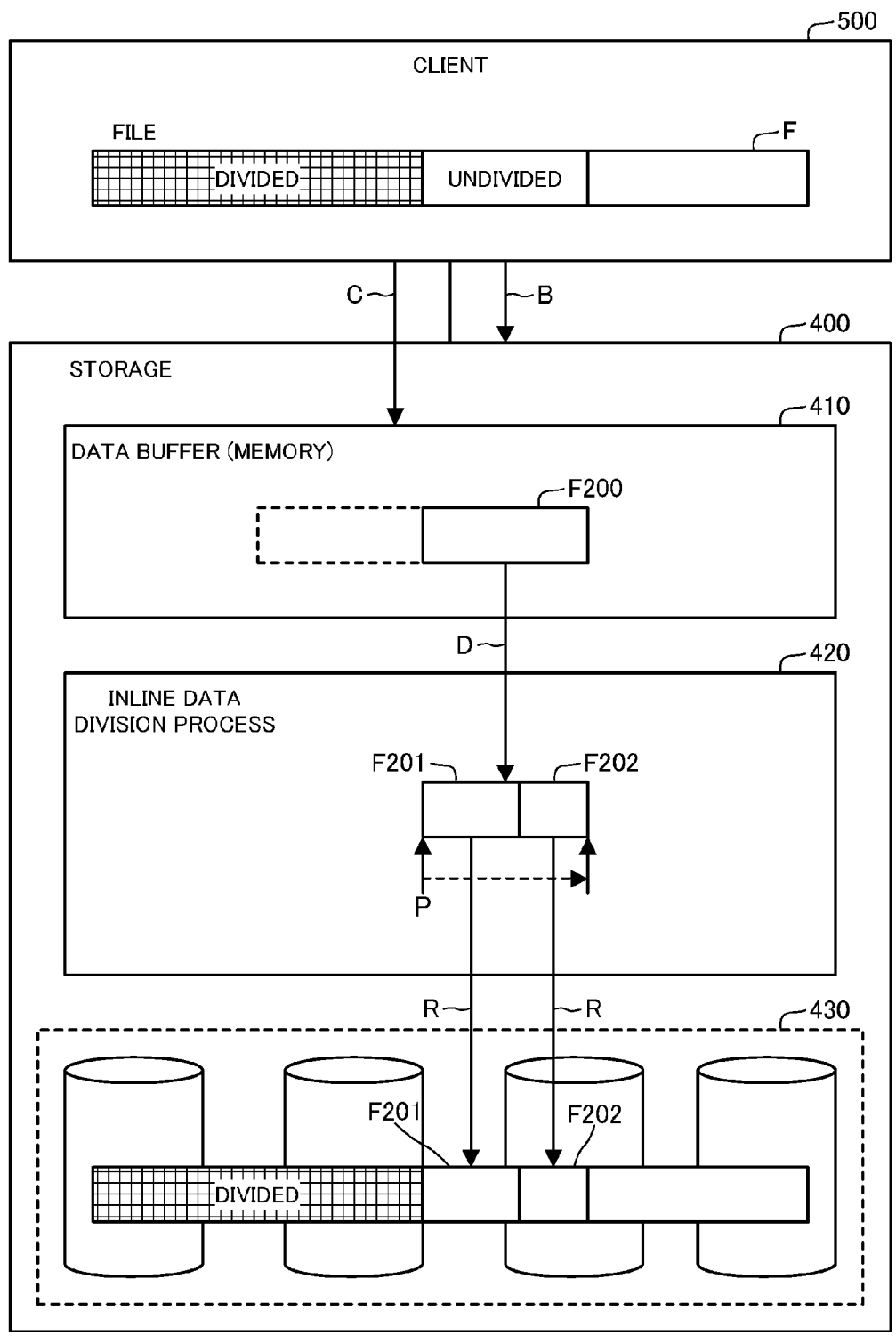
FIG. 1B is a diagram showing an aspect when data is stored in the storage system relating to the present invention.
Figure 2A:
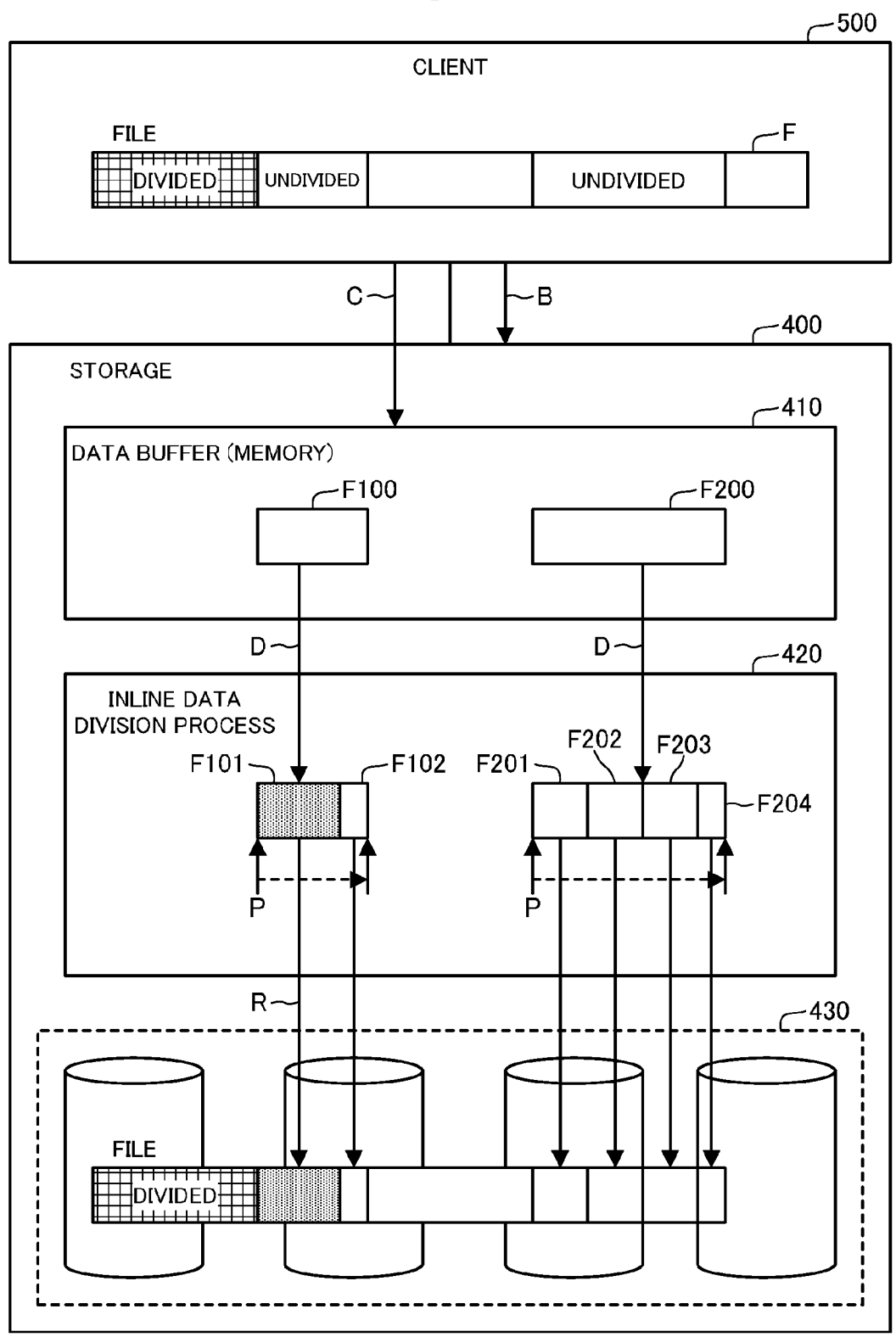
FIG. 2A is a diagram showing an aspect when data is stored in the storage system relating to the present invention.
Figure 2B:
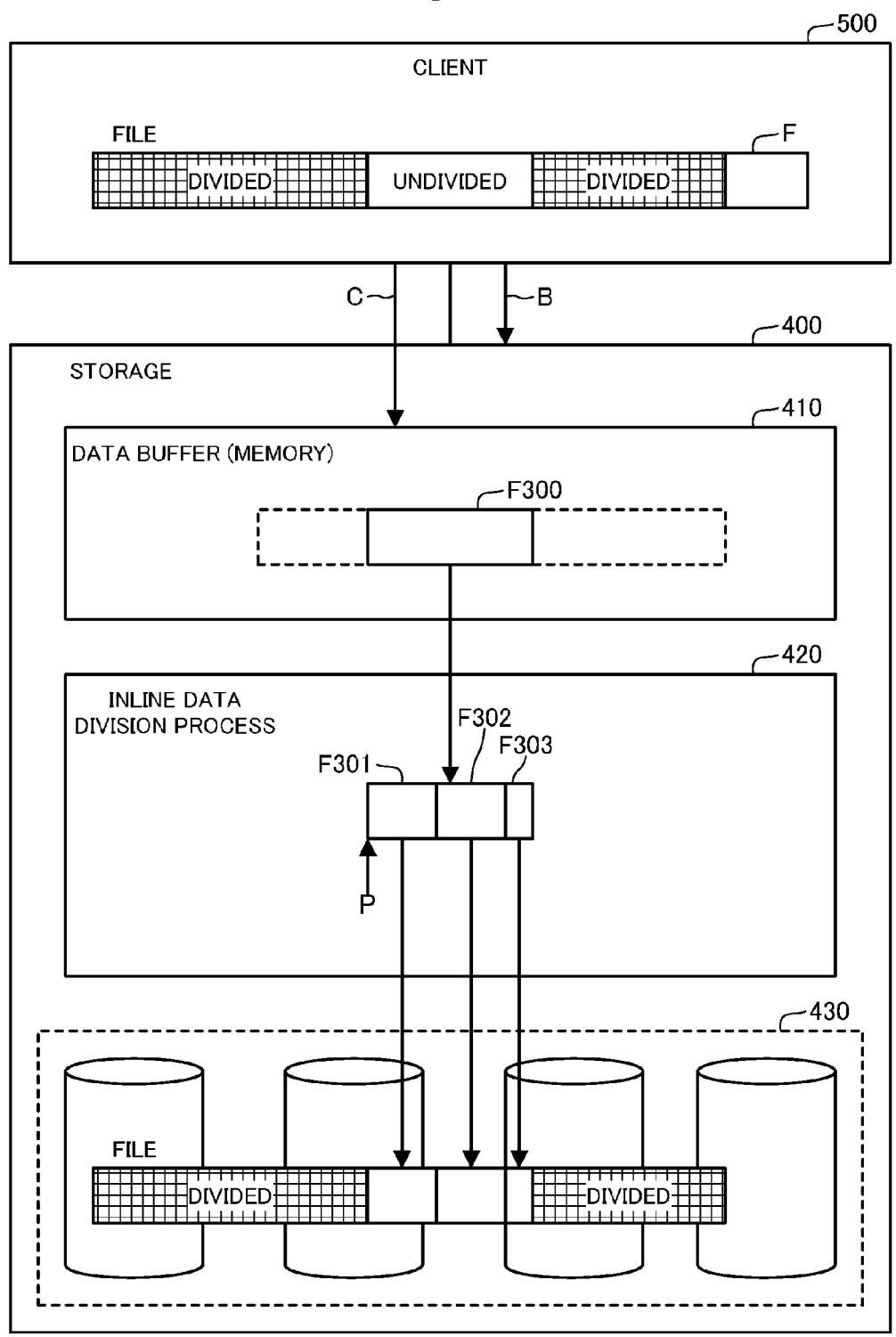
FIG. 2B is a diagram showing an aspect when data is stored in the storage system relating to the present invention.
Figure 4:
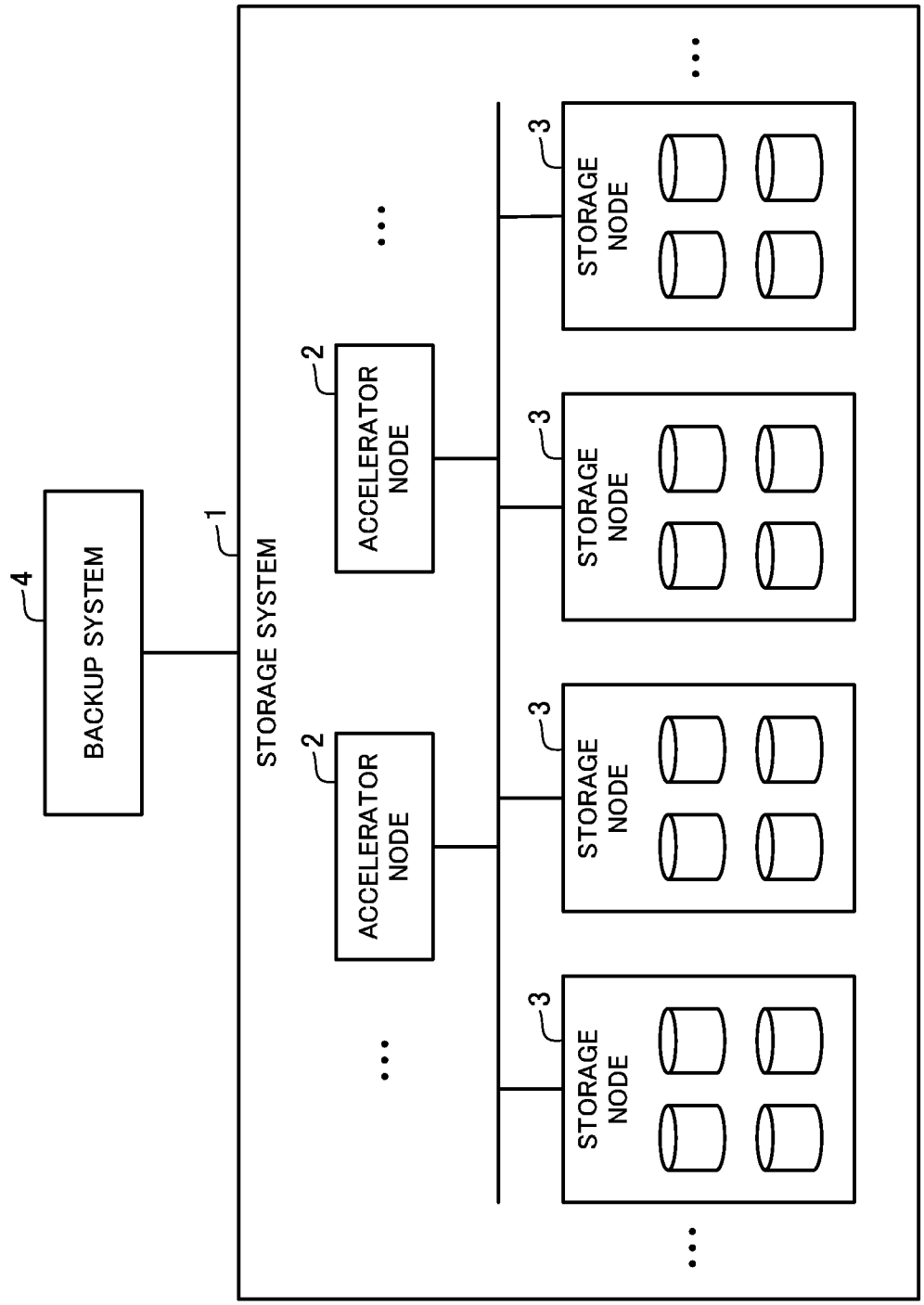
FIG. 4 is a block diagram showing a schematic configuration of the storage system according to the first exemplary embodiment of the present invention.

As shown in FIG. 4, the storage system 1 according to this exemplary embodiment employs a configuration in which a plurality of server computers are connected. To be specific, the storage system 1 includes accelerator nodes 2 that are server computers controlling a storage reproduction operation in the storage system 1 itself, and storage nodes 3 that are server computers including storage devices for storing data. The number of the accelerator nodes 2 and the number of the storage nodes 3 are not limited to those shown in FIG. 4. The storage system 1 may have a configuration in which more nodes 2 and more nodes 3 are connected.

Further, the storage system 1 according to this exemplary embodiment is a content-addressable storage system which divides data and makes the data redundant to distribute and store the data into a plurality of storage devices, and which specifies a storage location where the data is stored by a unique content address set depending on the content of the stored data. This content-addressable storage system will be described later.

Below, assuming the storage system 1 is one system, configurations and functions of the storage system 1 will be described. That is to say, the configurations and functions included by the storage system 1 to be described below may be included by the accelerator nodes 2 or the storage nodes 3. The storage system 1 is not limited to including the accelerator nodes 2 and the storage nodes 3 necessarily as shown in FIG. 4, and may have any configuration. For example, the storage system 1 may be configured by one computer. Moreover, the storage system 1 does not need to be a content-addressable storage system necessarily, and can be any storage system having a deduplication function.

Figure 5:
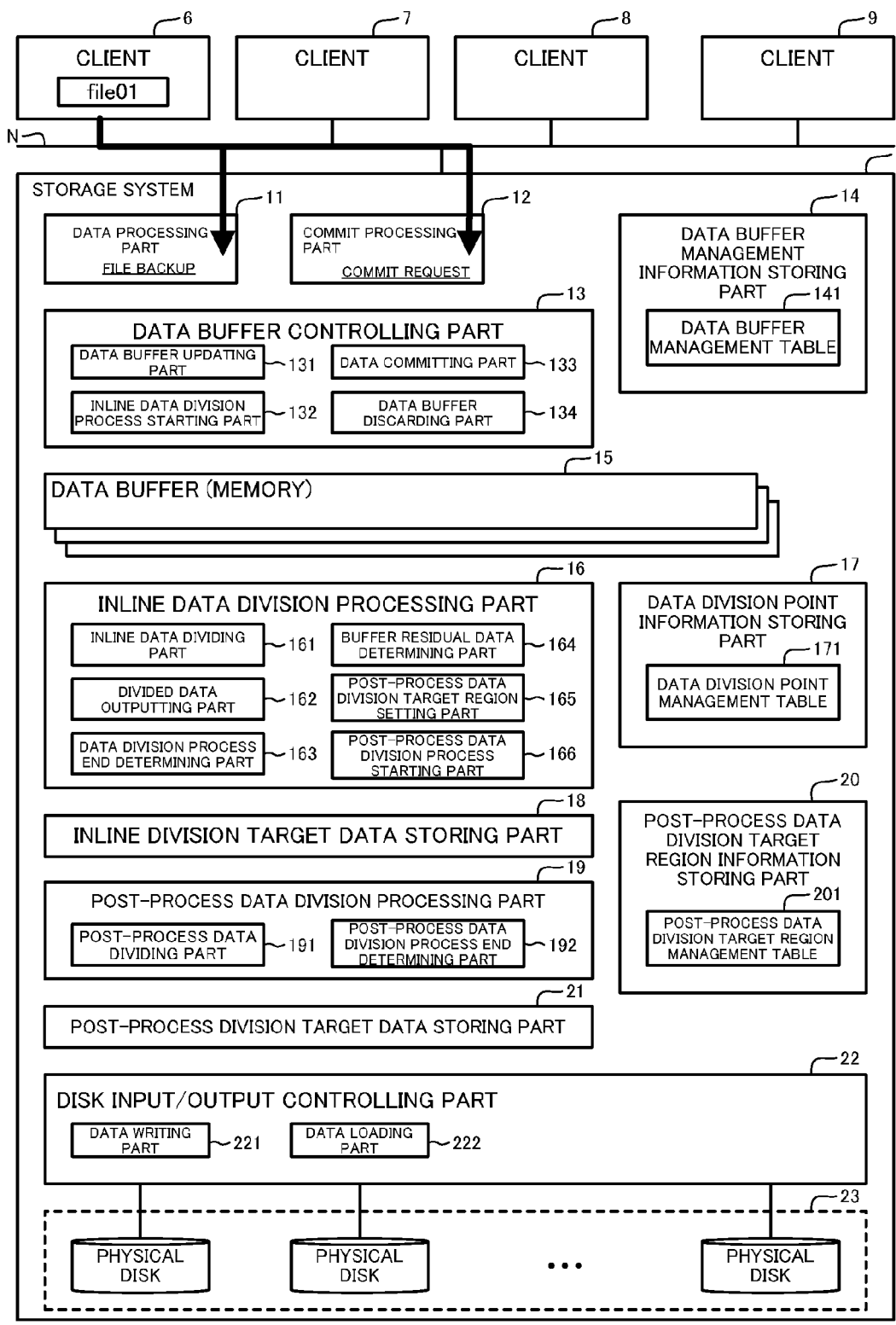
FIG. 5 is a function block diagram showing the configuration of the storage system according to the first exemplary embodiment of the present invention.

FIG. 5 shows a more detailed configuration of the above-mentioned storage system 1. In this diagram, clients 6 to 9 are equivalent to the abovementioned backup target devices 5 and backs up a file F that is stored data into the storage system 1 via the network N such as a local area network (LAN). The LAN N is a network line which connects the clients 6 to 9 and the storage system 1, and is used for transmission and reception of data between the clients 6 to 9 and the storage system 1. Although the LAN N is used as an example of a network line in this exemplary embodiment, any line such as a fiber channel and a SCSI cable may be used as long as transmission and reception of data between the clients 6 to 9 and the storage system 1 is enabled.

The storage system 1 includes processing parts and the like that are structured by retrieval of a program into an arithmetic device provided therein and that execute processes to be described below. Moreover, the storage system 1 includes storing parts and the like that are formed in a storage device such as a memory provided therein.

To be specific, as shown in FIG. 5, the storage system 1 includes a data processing part 11, a commit processing part 12, a data buffer controlling part 13, a data buffer management information storing part 14, and a data buffer 15 (a memory). Moreover, the storage system 1 includes an inline data division processing part 16, a data division point information storing part 17, an inline division target data storing part 18, a post-process data division processing part 19, a post-process data division target region information storing part 20, a post-process division target data storing part 21, and a disk input/output controlling part 22. Besides, the storage system 1 includes physical disks 23 that are storage devices for storing data to be stored.

In fact, the components provided in the abovementioned storage system 1 are composed by an arithmetic device such as a CPU (Central Processing Unit) and a storage device such as a hard disk drive that are provided in each of the accelerator nodes 2 and the storage nodes 3 shown in FIG. 4.

Next, each of the parts included by the abovementioned storage system 1 will be described in detail. First, the data processing part 11 receives data of a file F sent by the clients 6 to 9, and passes the data to the data buffer controlling part 13. The commit processing part 12 receives a commit request made by the clients 6 to 9, and communicates reception of the commit request to the data buffer controlling part 13. The data buffer controlling part 13 includes a data buffer updating part 131, a data committing part 133, an inline data division process starting part 132, and a data buffer discarding part 134.

The data buffer controlling part 13 causes the data buffer updating part 131 to store the data of the file F received from the data processing part 11 into the data buffer 15, and updates a data buffer management table 141 stored in the data buffer management information storing part 14. When a data buffer management table 141 for the file F to be backed up is not stored, the data buffer management table 141 is generated. Moreover, when there is no space in the data buffer 15 and the data of the file F received from the data processing part 11 cannot be stored into the data buffer 15, the data buffer controlling part 13 causes the inline data division process starting part 132 to make a space in the data buffer 15, and stores the data of the file received from the data processing part 11 into the made space.

Further, upon receiving a commit request from the commit processing part 12, the data buffer controlling part 13 causes the data committing part 133 to pass all of the data stored in the data buffer 15 to the inline data division processing part 16, and writes the data onto the physical disks 23. Moreover, the data buffer discarding part 134 monitors the status of update of the data buffer management table 141 and, when any data is not sent from the clients 6 to 9 for a given time, determines that a backup process is completed and causes the data committing part 133 to write all of the data stored in the data buffer 15 onto the physical disks 23. Then, the data buffer discarding part 134 deletes the data in the data buffer 15 of the file F after writing and the data buffer management table 141 of the file F after writing.

The inline data division processing part 16 includes an inline data dividing part 161, a divided data outputting part 162, a data division process end determining part 163, a buffer residual data determining part 164, a post-process data division target region determining part 165, and a post-process data division process starting part 166 as shown in FIG. 5. First, the inline data division processing part 16 causes the inline data dividing part 161 to divide the data received from the data buffer controlling part 13, and generates block data. After that, the inline data division processing part 16 causes the divided data outputting part 162 to write the block data obtained by division onto the physical disks 23, and then, records information on the written data into a data division point management table 171 stored in the data division point information storing part 17.

The disk input/output controlling part 22 having received data to be written from the divided data outputting part 162 controls input and output of data to and from the physical disks 23. Upon receiving data to be written, a data writing part 221 included by the disk input/output controlling part 22 stores the data onto the physical disks 23, and returns a content address. Upon receiving a content address with a data retrieval request, a data loading part 222 included by the disk input/output controlling part 22 returns data corresponding to the content address stored on the physical disks 23.

The storage system 1 according to this exemplary embodiment has a characteristic point in a data division process. Referring to FIGS. 9 and 10, an example of a process of executing deduplication by using a content address on block data obtained by division and writing onto and retrieving from the physical disks 23 will be described. The writing and retrieving process in the storage system 1 is not limited to being executed in a manner to be described below.

First, as shown by FIG. 9 and arrow Y1 in FIG. 10, the storage system 1 accepts input of a file F that the storage system 1 is requested to write. Then, as shown by FIG. 9 and arrow Y2 in FIG. 10, the storage system 1 divides the file F into block data D by a division method to be described later.

Subsequently, based on the data content of the block data D obtained by division, the storage system 1 calculates a unique hash value H representing the data content (arrow Y3 in FIG. 10). For example, the hash value H is calculated based on the data content of the block data D by using a preset hash function.

Subsequently, by using the hash value H of the block data D of the file F, the storage system 1 checks whether the block data D is already stored or not. To be specific, regarding already stored block data D, a hash value H thereof and a content address CA representing a storage location are associated and registered in an MFI (Main Fragment Index) file. Therefore, in a case where the hash value H of the block data D calculated before being stored exists in the MFI file, it is possible to determine that block data D of the same content is already stored (arrow Y4 in FIG. 10). In this case, the storage system 1 acquires a content address CA associated with a hash value H in the MFI that agrees with the hash value H of the block data D before being stored, from the MFI file. Then, the storage system 1 returns this content address CA as a content address CA of the block data D that the storage system 1 is requested to write.

Then, the storage system 1 uses already stored data referred to by the returned content address CA, as the block data D that the storage system 1 is requested to write. That is to say, designating a region referred to by the returned content address CA as a storage destination of the block data D that the storage system 1 is requested to write is regarded as being equivalent to storing the block data D that the storage system 1 is requested to write. Consequently, it becomes unnecessary to actually store the block data D that the storage system 1 is requested to write onto the physical disks 23.

On the other hand, in the case of determining that the block data D relating to the writing request is not stored yet, the storage system 1 writes the block data D relating to the writing request in the following manner. First, the storage system 1 compresses the block data D relating to the writing request and divides into a plurality of fragment data of predetermined volume as shown by arrow Y5 of FIG. 10. For example, as shown by reference symbols D1 to D9 in FIG. 9, the storage system 1 divides the block data D into nine fragment data (divided data 91). Then, the storage system 1 generates redundant data so as to be capable of restoring original block data even if some of the fragment data obtained by division are lost, and adds the redundant data to the fragment data 91 obtained by division. For example, as shown by reference symbols D10 to D12 in FIG. 9, three fragment data (redundant data 92) are added. Thus, the storage system 1 generates a data set 90 composed of twelve fragment data including the nine divided data 91 and the three redundant data 92.

Subsequently, the storage system 1 distributes and stores the fragment data composing the data set generated as described above into the respective storage regions formed in storage devices. For example, as shown in FIG. 9, in the case of generating the twelve fragment data D1 to D12, the storage system 1 stores the fragment data D1 to D12 one by one into data storage files formed in a plurality of storage devices, respectively (see arrow Y6 in FIG. 10).

Subsequently, the storage system 1 generates and manages a content address CA representing storage locations of the fragment data D1 to D12 stored as described above, that is, representing a storage location of the block data D restored based on the fragment data D1 to D12. To be specific, the storage system 1 generates a content address CA by combining part of a hash value H (a short hash; e.g., the beginning 8B (byte) of the hash value H) calculated based on the content of the stored block data D and information representing a logical storage location. Then, this content address CA is returned to a file system in the storage system 1 (arrow Y7 in FIG. 10). Then, the storage system 1 associates and manages identification information such as a file name of backup target data and the content address CA in the file system.

Further, each of the storage nodes 3 associates and manages a content address CA of block data D and a hash value H of the block data D in the MFI file. Thus, the content address CA is associated with information specifying a file, a hash value H and so on, and stored into the storage devices of the accelerator nodes 2 and the storage nodes 3.

Further, the storage system 1 controls to retrieve a file stored in the abovementioned manner. For example, upon receiving a retrieval request with a specific file designated, the storage system 1 first designates a content address CA including a short hash that is part of a hash value corresponding to the file relating to the retrieval request and information on a logical location, based on the file system. Then, the storage system 1 checks whether the content address CA is registered in the MFI file or not. If not registered, the requested data is not stored, so that the storage system 1 returns an error.

On the other hand, in a case where the content address CA relating to the retrieval request is registered, the storage system 1 specifies a storage location designated by the content address CA and retrieves each fragment data stored in this specified storage location, as the data relating to the retrieval request. At this moment, if data storage files in which the fragments are stored, respectively, and a storage location of the fragment data in one of the data storage files are found, the storage system 1 can specify storage locations of the other fragment data from the same storage location.

Then, the storage system 1 restores block data D from the fragment data retrieved in response to the retrieval request. Moreover, the storage system 1 connects a plurality of restored block data D to restore as a group of data such as a file A, and returns.

The storage system 1 according to this exemplary embodiment is CAS (Content-Addressable Storage) as mentioned above, and therefore, inputs and outputs data via a content address. However, the storage system 1 may be a storage system performing block access. In this case, a block address is used instead of a content address.

Next, the abovementioned data division process of generating block data to be written onto the physical disks 23 will be described in detail. As mentioned above, the inline data division processing part 16 divides data received from the data buffer controlling part 13, writes the divided data onto the physical disks 23, and records the information into the data division point management table 171. Moreover, the inline data division processing part 16 determines whether to cause the data division process end determining part 173 to end the data division process or cause the post-process data division processing part 19 to perform redivision of subsequent data.

In a case where the data division process end determining part 163 determines to end the data division process, the inline data division processing part 16 causes the buffer residual data determining part 164 to select data necessary for a data revision process when subsequent data reaches, pass the data to the data buffer controlling part 13, and store the data into the data buffer 15 again. On the other hand, in a case where the data division process end determining part 163 determines to perform redivision of subsequent data, the inline data division processing part 16 causes the post-process data division target region setting part 165 to set information into the post-process data division target region management table 201 in the post-process data division target region information storing part 20. Then, the inline data division processing part 16 causes the post-process data division process starting part 166 to pass the data necessary for the data redivision process of a post process to the post-process data division processing part 19 and start the post-process data division processing part 19.

The post-process data division processing part 19 includes a post-process data dividing part 191 and a post-process data division process end determining part 192. The post-process data division processing part 19 stores data received from the inline data division processing part 16 into the post-process division target data storing part 21, and thereafter, causes the post-process data dividing part 191 to start a redivision process on data already written in the physical disks 23. After that, the post-process data division processing part 19 continues the data redivision process until the post-process data division process end determining part 192 determines to end the data redivision process. Data redivided while the data redivision process is continued are written onto the physical disks 23 by the divided data outputting part 162.

Figure 11A:
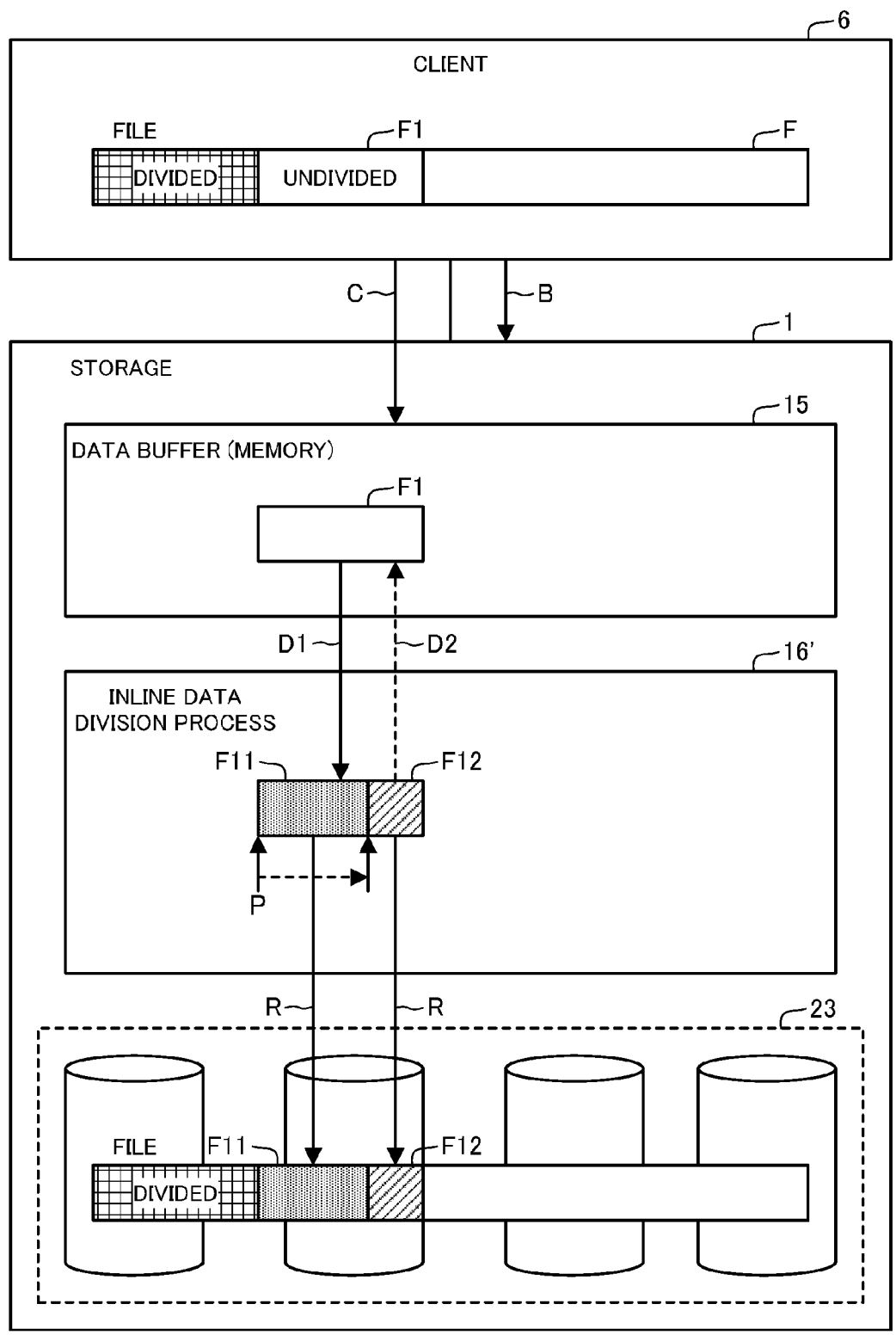
FIG. 11A is an explanation diagram explaining an aspect of the data writing process in the storage system disclosed in FIG. 5.

Referring to FIGS. 11A to 12B, an example of the data division process by the storage system 1 having the abovementioned configuration will be described. First, an example in FIGS. 11A and 11B shows an operation in a case where, while the client 6 is backing up a file F into the storage system 1 (see arrow B), a commit occurs in a state that data F1 is in the data buffer 15. In FIGS. 11A to 12B, the data division process and the redivision process by the inline data division processing part 16 and the post-process data division processing part 19 are denoted by reference numeral 16'.

When a commit (input of a command to write) occurs in the state shown in FIG. 11A (see arrow C), in the inline data division process 16', the data F1 in the data buffer 15 at the moment is divided into block data F11 and block data F12 (see arrow D1), and written as the block data F11 and the block data F12 onto the physical disks 23 (see arrow R). At this moment, the division process on the data F1 is executed by calculating a finger print value from the beginning of the data F1 by the inline method, deciding a place having a specific finger print value as a division point P, and dividing into block data of variable lengths. A finger print value is a value used for checking identify of data. For example, a finger print value is a hash value obtained by multiplying a hash function by the content of data. However, a method for deciding a division point P is not limited to deciding by using a finger print value mentioned above, and may be another method based on the content of data.

In the example of FIG. 11A, it is assumed that the block data F11 is divided by using an optimum finger print value, that is, divided by a preset division standard (see a shaded part in FIG. 11A). On the other hand, because the block data F12 is forcibly divided at the timing of the commit, it is assumed that the block data F12 is not divided by using the optimum finger print value and is not divided by the present division standard (see a hatched part in FIG. 11A).

Therefore, in the inline data division process 16', the block data F12 (residual data) is left as the data F12 on the data buffer 15 so that, when subsequent data is written after the commit, data including the block data F12 can be redivided (see arrow D2). The block data F12 written into the physical disks 23 may be stored into the data buffer 15 again.

Figure 11B:
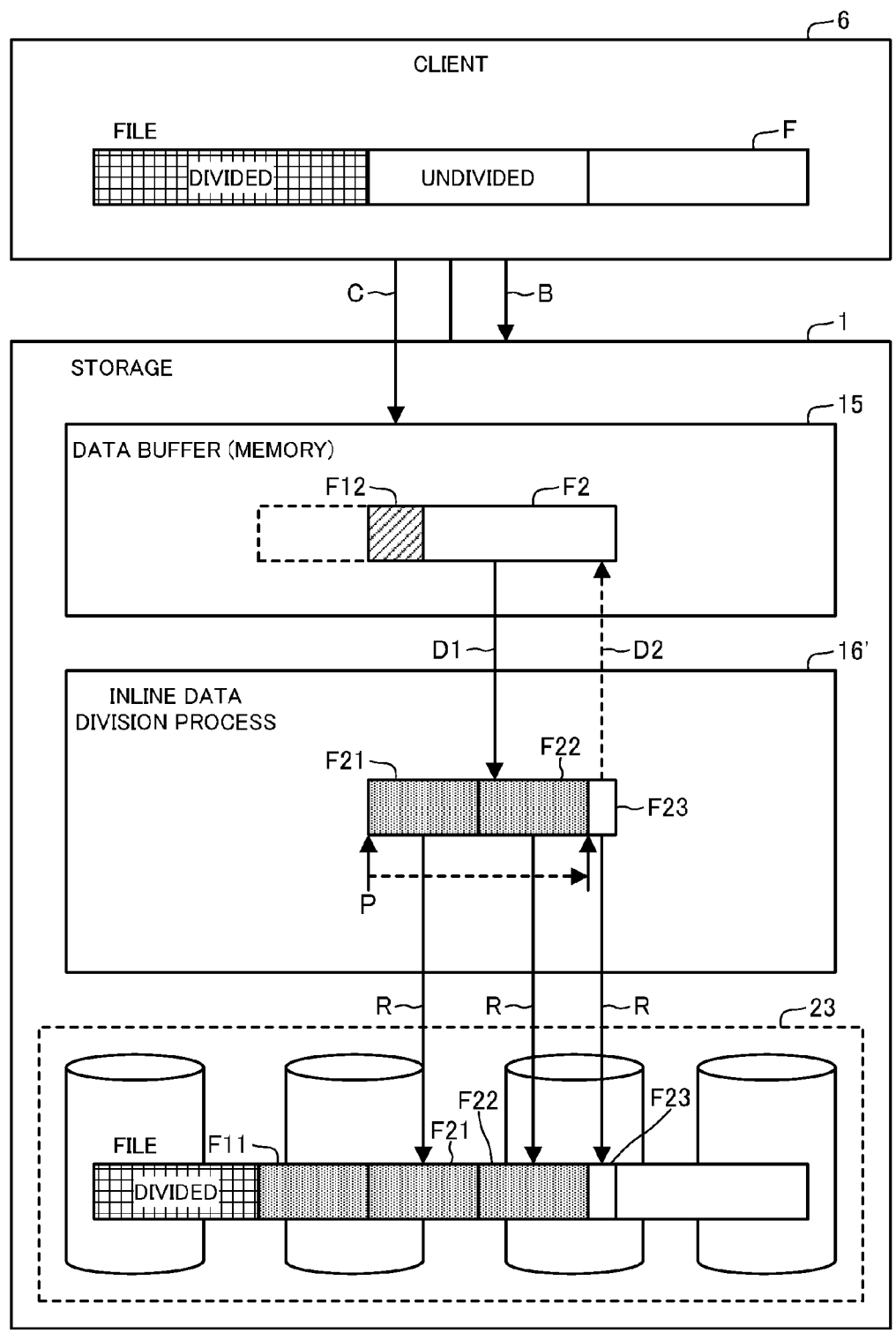
FIG. 11B is an explanation diagram explaining an aspect of the data writing process in the storage system disclosed in FIG. 5.

After that, as shown in FIG. 11B, data F2 (continuing data) continuing to the rear end of the block data F12 (residual data) located on the rear side of the data F1 is inputted into the data buffer 15. When a commit occurs again in a state that the data F2 continuing to the block data F12 is in the data buffer 15 (see reference symbol C), data (connected data) in which the block data F12 (residual data) and the data F2 (continuing data) are connected is divided (redivided) into block data F21, F22 and F23 in the inline data division process 16' (see reference symbol D1). Then, the block data F21, F22 and F23 obtained by division are written as the block data F21, F22 and F23 onto the physical disks 23, respectively (see reference symbol R).

At this moment, division of the data that the block data F12 (residual data) and the data F2 (continuing data) are connected is performed by using a finger print value calculated from the beginning of the data. Therefore, the block data F21 and F22 are divided at division points P properly set by using a finger print value, and are divided data optimum for deduplication (a shaded part in FIG. 11B).

Figure 12A:
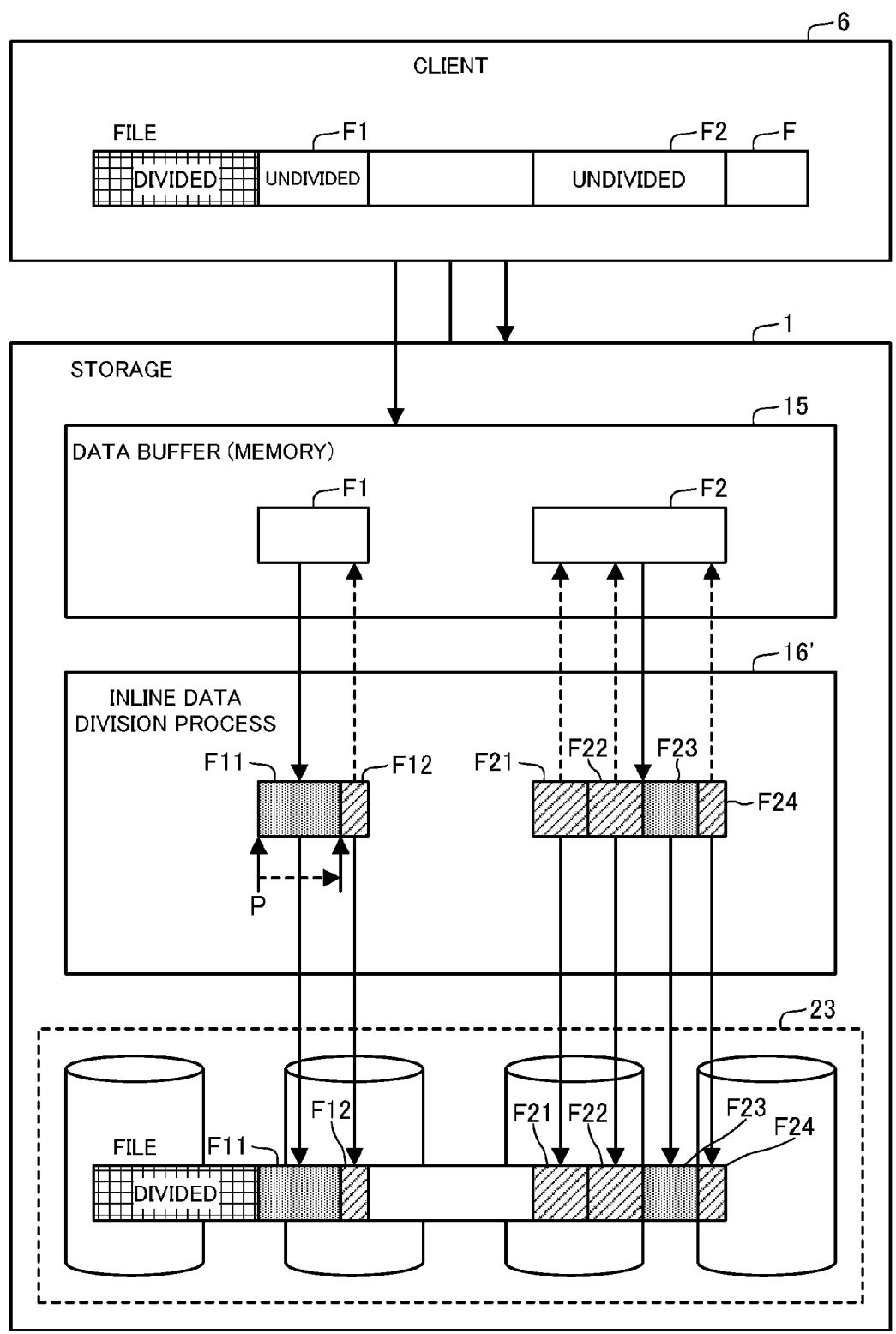
FIG. 12A is an explanation diagram explaining an aspect of the data writing process in the storage system disclosed in FIG. 5.
Figure 12B:
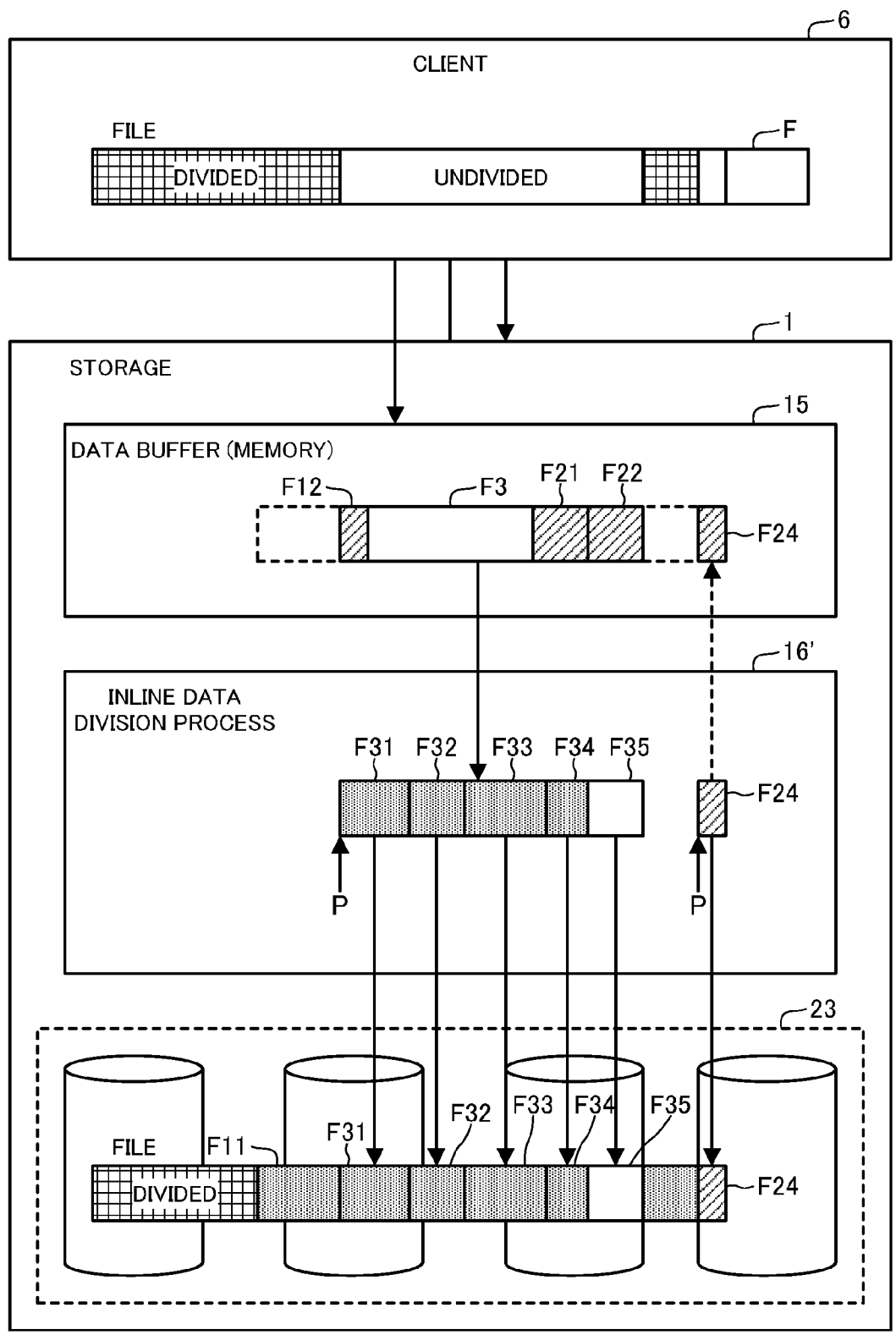
FIG. 12B is an explanation diagram explaining an aspect of the data writing process in the storage system disclosed in FIG. 5.

Next, an example in FIGS. 12A and 12B shows an operation in a case where a commit occurs in a state that data F1 (a first data group) and data F2 (a second data group) separated from the data 1 are in the data buffer 15 as shown in FIG. 12A while the client 6 is backing up a file F into the storage system 1.

When a commit occurs in the state shown in FIG. 12A, the data F1 and the data F2 in the data buffer 15 at the moment is divided into block data F11, F12, F21 to F24 in the inline data division process 16' and written as the block data F11, F12, F21 to F24 onto the physical disks 23. At this moment, in the division process on the data F1, in the same manner as described above, a finger print value is calculated from the beginning of the data F1 and a division point P is decided. Therefore, the block data F11 is divided by a preset division standard (see a shaded part in FIG. 12A), and the block data F12 is not divided by the present division standard (see a hatched part in FIG. 12A). In the same manner, in the division process on the data F2, only the block data F23 is divided by a preset division standard (see a shaded part in FIG. 12A), and the block data F21, F22 and F24 are not divided by the present division standard (see a hatched part in FIG. 12A).

Therefore, in the inline data division process 16', the block data F12, F21, F22 and F24 (residual data) are left on the data buffer 15 so that redivision of data including the block data F12, F21, F22 and F24 can be performed when subsequent data is written after the commit (see dashed arrow). The block data F12, F21 and so on written on the physical disks 23 may be stored into the data buffer 15 again.

After that, as shown in FIG. 12B, data F3 (continuing data), which is data continuing to the rear end of the block data F12 (first residual data) located on the read side of the data F1 and is data continuing to the front end of the block data F21 (second residual data) located on the front side of the data F2, is inputted into the data buffer 15. That is to say, the data F3 located between the data F1 and the data F2 is inputted into the data buffer 15. When a commit occurs again in a state that the data F3 continuing to the block data F12 and F21 is in the data buffer 15, data (connected data) in which the block data F12, the data F3, the block data F21 and F22 are connected is divided (redivided) into block data F31 to F35 in the inline data division process 16'. Then, the block data F31 to F35 and F24 are written onto the physical disks, respectively.

At this moment, the abovementioned data division is performed by using a finger print value calculated from the beginning of the data. Therefore, the division points P of the block data F31, F32, F33 and F34 become division points properly set by using a finger print value, and these block data become divided data optimum for deduplication (see a hashed portion in FIG. 12B).

In a case where the division point of the block data F21 shown in FIG. 12A and the division point of the block data F34 shown in FIG. 12B do not coincide, it is highly probable that data from the block data F35 to F24 shown in FIG. 12B are not optimum divided data. Therefore, data division optimum for deduplication is performed by redividing the data from the block data F35 to F24 in the post process.

[Operation]

Next, referring to flowcharts shown in FIGS. 13 to 26, an operation of the abovementioned storage system 1 when a client backs up a file into the storage system 1 will be described in detail.

Figure 13:
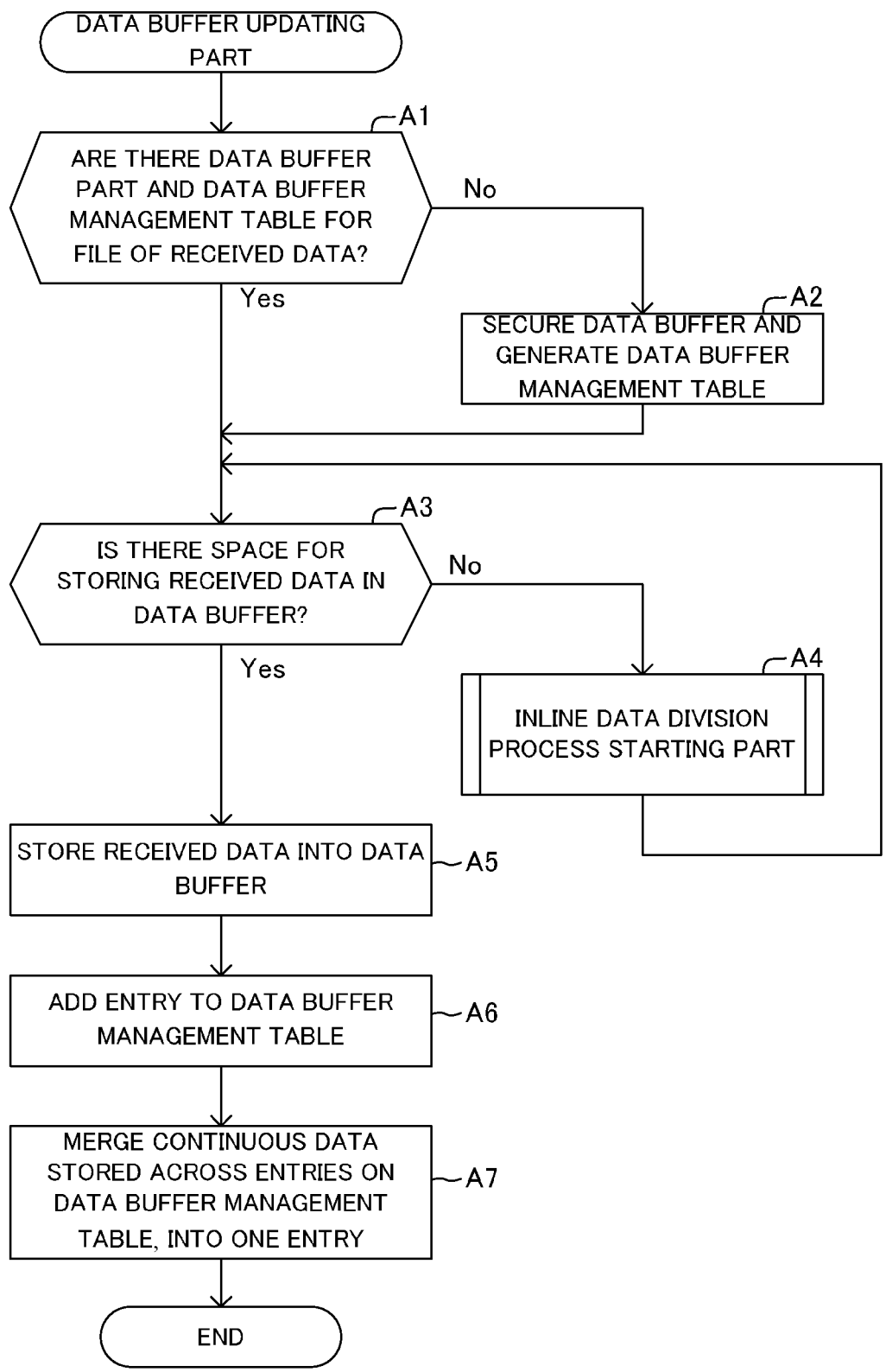
FIG. 13 is a flowchart showing an operation of the data writing process in the storage system disclosed in FIG. 5.

FIG. 13 shows an operation of the data buffer updating part 131 in the data buffer controlling part 13. When receiving data of a file F from the data processing part 11, the data buffer updating part 131 checks whether there are the data buffer 15 and the data buffer management table 141 for the file F (step A1). In a case where there are not the data buffer 15 and the data buffer management table 141 for the file F (step A1: No), the data buffer updating part 131 newly generates the data buffer 15 and the data buffer management table 141 for the file F (step S2).

Next, the data buffer updating part 131 checks whether there is a space for storing the received data in the data buffer 15 (step A3). In a case where there is not a space for storing the received data in the data buffer 15 (step A3: No), the inline data division process starting part 132 is caused to generate a space in the data buffer 15 (step A4).

In a case where there is a space for storing the received data in the data buffer 15 (step A3: Yes), the data buffer updating part 131 stores the received data into the data buffer 15 (step A5), and adds an entry to the data buffer management tablet 141 (step A6).

In a case where continuous data are stored across a plurality of entries on the data buffer management table 141, the data buffer updating part 131 merges the data into one entry (step A7). Entries are stored in increasing order of file offsets within the data buffer management table 141.

Figure 14:
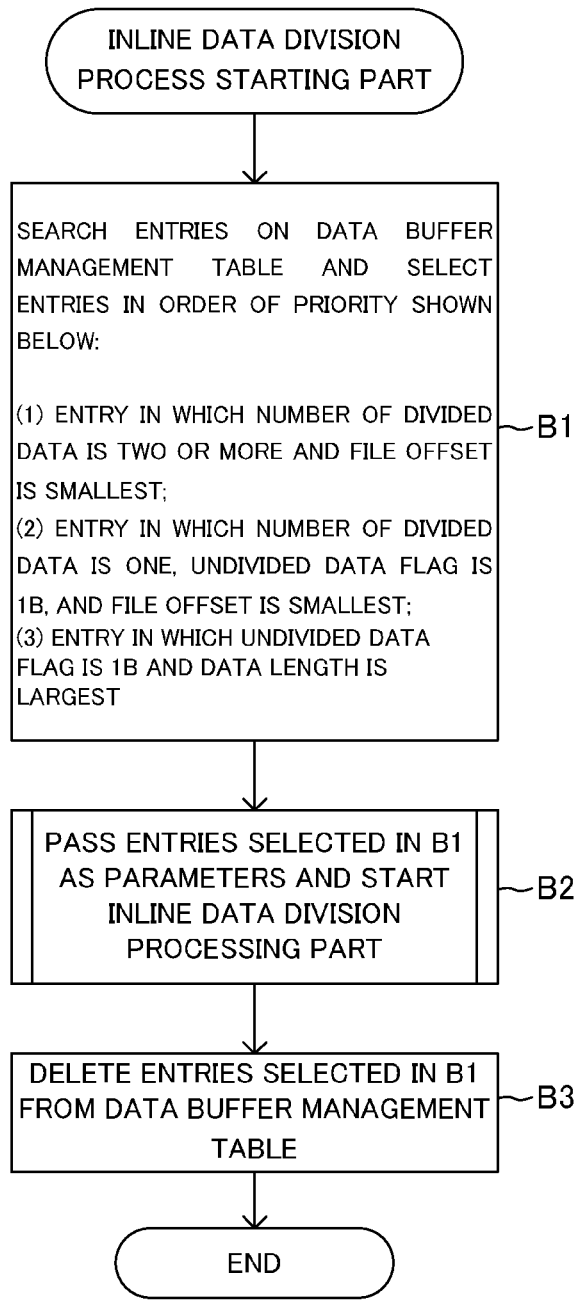
FIG. 14 is a flowchart showing an operation of the data writing process in the storage system disclosed in FIG. 5.

An example of the data buffer management table 141 is shown in FIG. 6. The contents of data in the data buffer management table 141 are as shown below:
  file name: the name of a file being backed up
  data buffer address: the address of a data buffer for the file being backed up
  data buffer size: the data buffer size secured for the file being backed up
  file offset: the file offset of data stored in the data buffer (entries are registered in increasing order of file offsets)
  data length: the length of the data stored in the data buffer
  number of divided data: the number of data left in the data buffer after once divided, included in the data
  undivided data flag: a flag showing whether the data includes data having not been divided yet
  data address: the address in the data buffer where the data is stored FIG. 14 shows an operation of the inline data division process starting part 132 in the data buffer controlling part 13.

First, the inline data division process starting part 132 searches the entries on the data buffer management table 141 in the order of priority shown below (step B1):
(1) an entry in which the number of divided data is two or more and the file offset is the smallest;
(2) an entry in which the number of divided data is one, the undivided data flag is 1B, and the file offset is the smallest;
(3) an entry in which the undivided data flag is 1B and the data length is the largest.

Next, the inline data division process starting part 132 passes the entries selected in step B1 as parameters to start the inline data division processing part 16 (step B2). Finally, the inline data division process starting part 132 deletes the entries selected in step B1 from the data buffer management table 241 (step B3).

Figure 15:
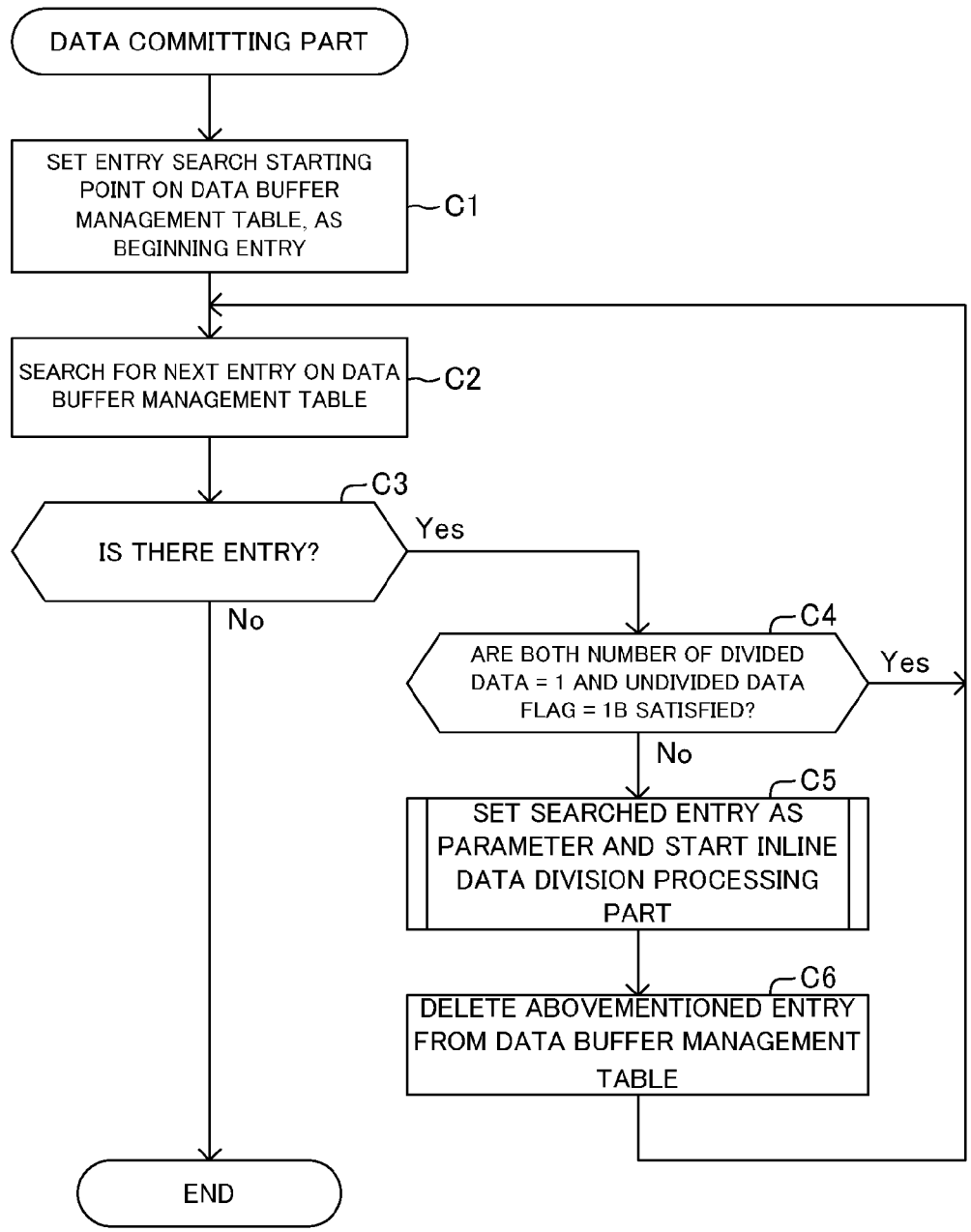
FIG. 15 is a flowchart showing an operation of the data writing process in the storage system disclosed in FIG. 5.

FIG. 15 shows an operation of the data committing part 133 in the data buffer controlling part 13.

First, the data committing part 133 sets a point to start searching the entries on the data buffer management table 141 as a beginning entry (step CO). Next, the data committing part 133 searches for an entry on the data buffer management table 141 (step C2) and, in a case where there is no entry (step C2: No), ends the process (step C3).

In a case where there is an entry in step C2 (step C3: Yes), the data committing part 133 checks the content of the entry (step C4). In the case of "number of divided data=1 and undivided data flag=1B," the data committing part 133 searches for a next entry (step C2). If not (step C4: No), the data committing part 133 sets the searched entry as a parameter and causes the inline data division processing part 16 to start (step C5), and deletes the entry on the data buffer management table 141 (step C6). After that, the data committing part 133 searches for a next entry (step C2).

Figure 16:
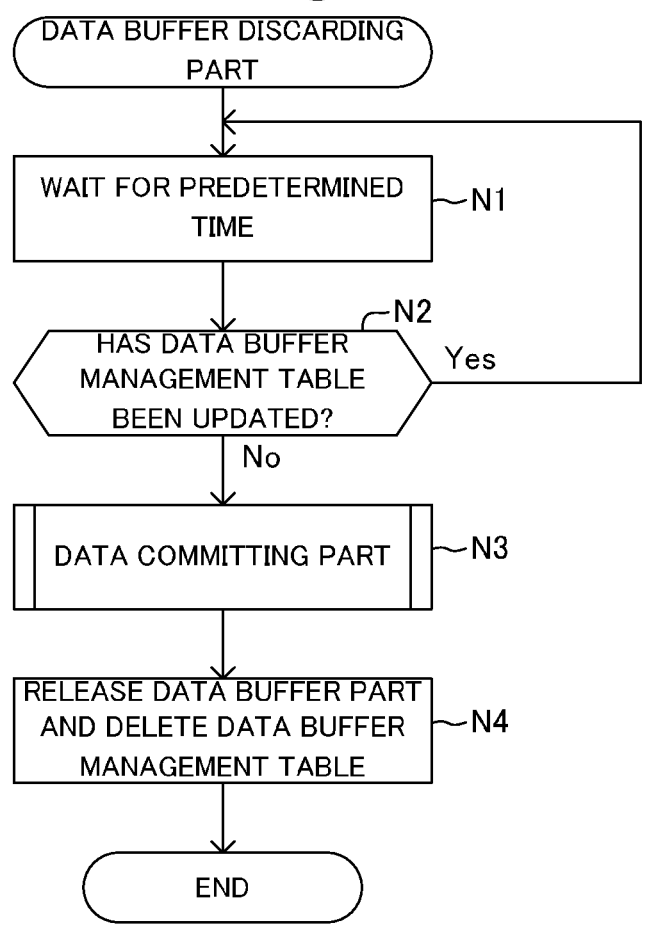
FIG. 16 is a flowchart showing an operation of the data writing process in the storage system disclosed in FIG. 5.

FIG. 16 shows an operation of the data buffer discarding part 134 in the data buffer controlling part 13. The data buffer discarding part 134 waits for a predetermined time (step N1), and thereafter, determines whether the data buffer management table 141 has been updated or not (step N2). In a case where the data buffer management table 141 has been updated (step N2: Yes), the data buffer discarding part 134 waits for the predetermined time again (step N1).

On the other hand, in a case where the data buffer management table 141 has not been updated (step N2: No), the data buffer discarding part 134 calls the data committing part 133 (step N3), and thereafter, deletes the data buffer 15 and the data buffer management table 141 (step N4).

Figure 17A:
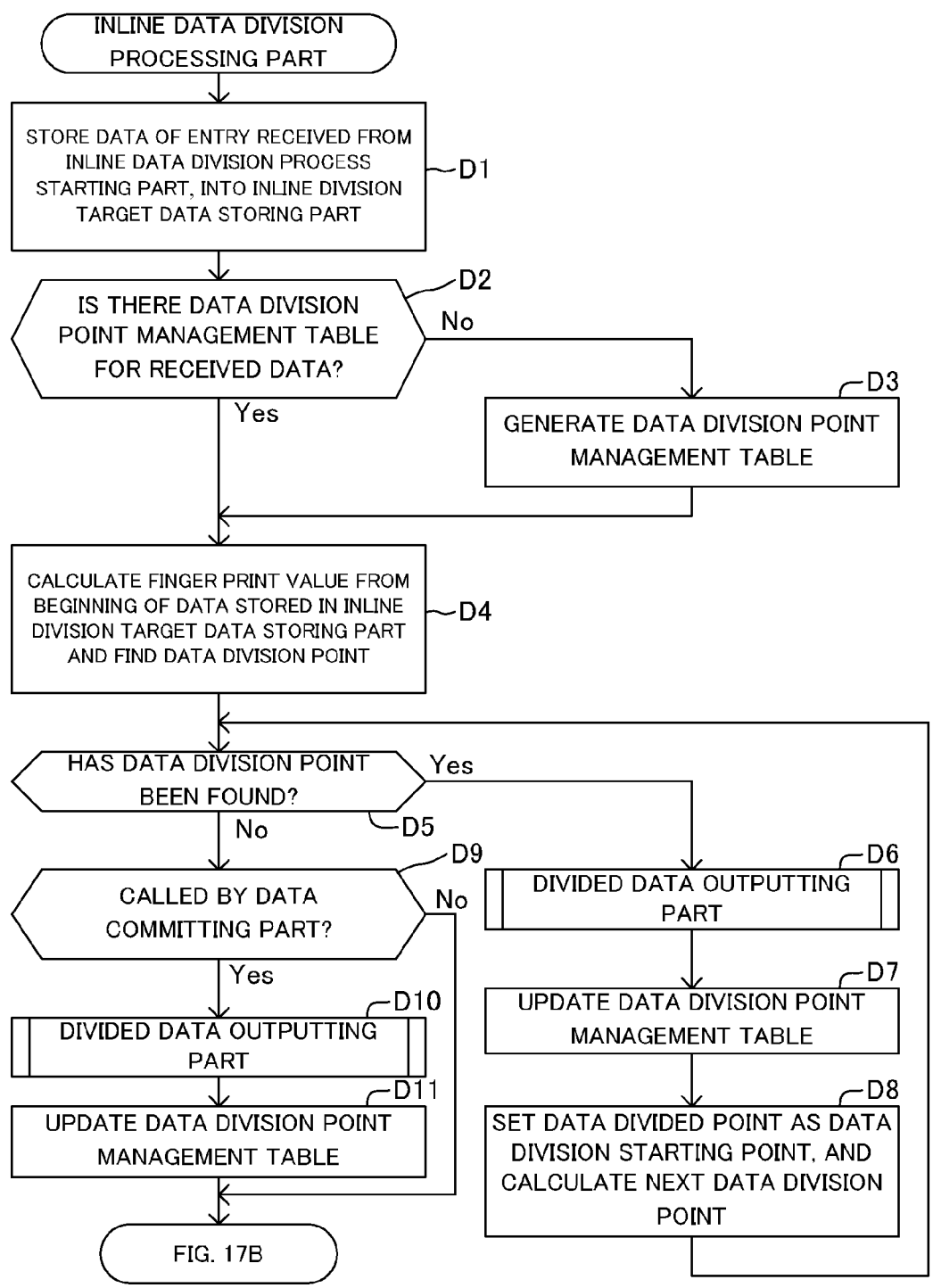
FIG. 17A is a flowchart showing an operation of the data writing process in the storage system disclosed in FIG. 5.
Figure 17B:
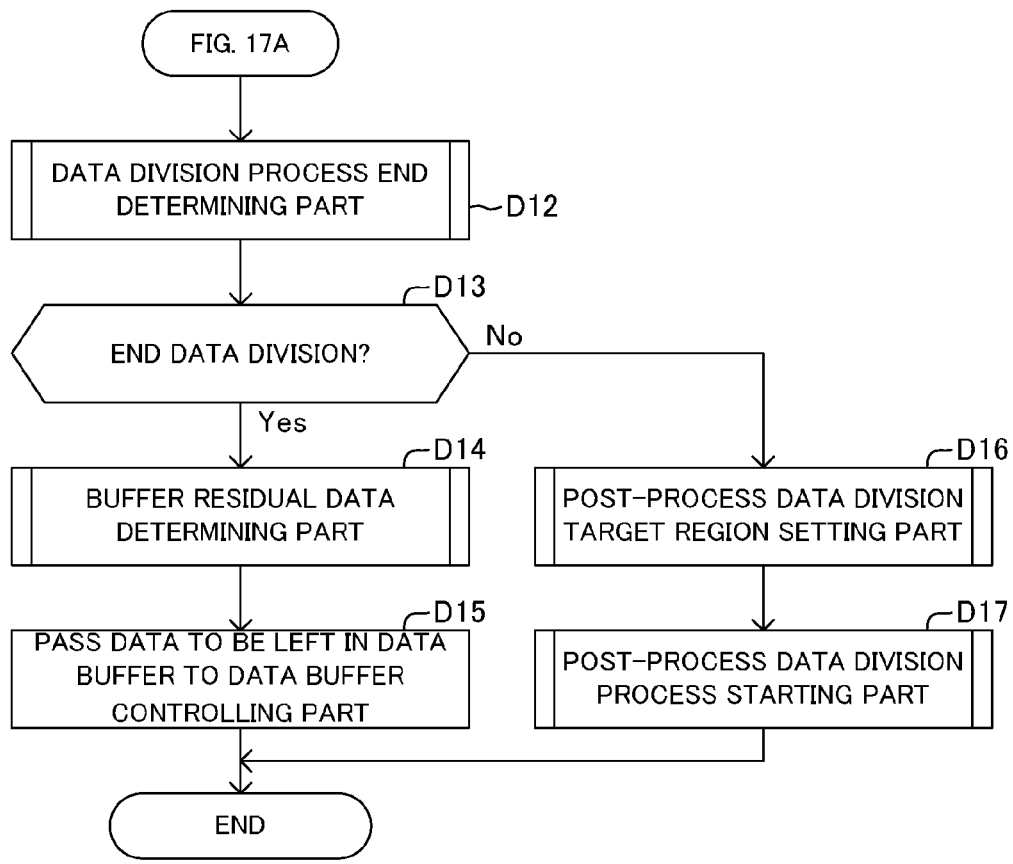
FIG. 17B is a flowchart showing an operation of the data writing process in the storage system disclosed in FIG. 5.

FIGS. 17A and 17B show an operation of the inline data division processing part 16. First, the inline data division processing part 16 stores data received as a parameter from the inline data division process starting part 132 into the inline division target data storing part 18 (step D1).

Then, the inline data division processing part 16 checks whether there is the data division point management table 171 for the data received as the parameter or not (step D2) and, in a case where there is not the data division point management table 171 (step D2: No), generates the data division point management table 171 (step D3).

Next, the inline data division processing part 16 calculates a finger print value from the beginning of the data to find a data division point (step D4). Then, the inline data division processing part 16 determines whether a data division point is found or not (step D5). In a case where a data division point is found (step D5: Yes), the inline data division processing part 16 causes the divided data outputting part 162 to write the divided data into the physical disks 23 (step D6), updates the data division point management table 171 (step D7), and calculates a next data division point (step D8).

On the other hand, in a case where a data division point is not found, the inline data division processing part 16 determines whether the inline data dividing part 161 is caused to start by the data committing part 133 or not (step D9). In a case where the inline data dividing part 161 is caused to start by the data committing part 133 (step D9: Yes), the inline data division processing part 16 causes the divided data outputting part 162 to write data left in the inline division target data storing part 18 into the physical disks 23 (step D10), and updates the data division point management table 171 (step D11).

An example of the data division point management table 171 is shown in FIG. 7. The contents of data in the data division point management table 171 are as described below:
  file name: the name of a file being backed up
  file offset: the file offset of data stored in the data buffer
  data length: the length of the data stored in the data buffer
  finger print value: the finger print value of a point where the data is divided
  content address: the content address where the data is stored Next, the inline data division processing part 16 calls the data division process end determining part 163 (step D12) to determine whether to end the data division process or not (step D13). In the case of ending the data division process (step D13: Yes), the inline data division processing part 16 calls the buffer residual data determining part 164 to determine data to be left in the data buffer (step D14), and passes the data to the data buffer controlling part 13 (step D15).

On the other hand, in the case of continuing the data division process (step D13: No), the inline data division processing part 16 calls the post-process data division target region setting part 165 (step D16) to set a region in which redivision of data is to be executed. Then, the inline data division processing part 16 causes the post-process data division process starting part 166 to start the post-process data division processing part 19 (step D17).

Figure 18:
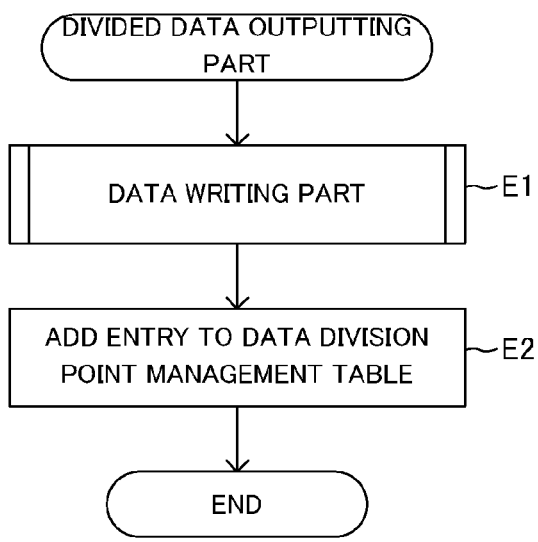
FIG. 18 is a flowchart showing an operation of the data writing process in the storage system disclosed in FIG. 5.

FIG. 18 shows an operation of the divided data outputting part 162 in the inline data division processing part 16. The divided data outputting part 162 causes the data writing part 221 to write data into the physical disks 23 (step E1). The divided data outputting part 162 then adds an entry to the data division point management table 171 by using a content address returned from the data writing part 221 (step E2).

Figure 19:
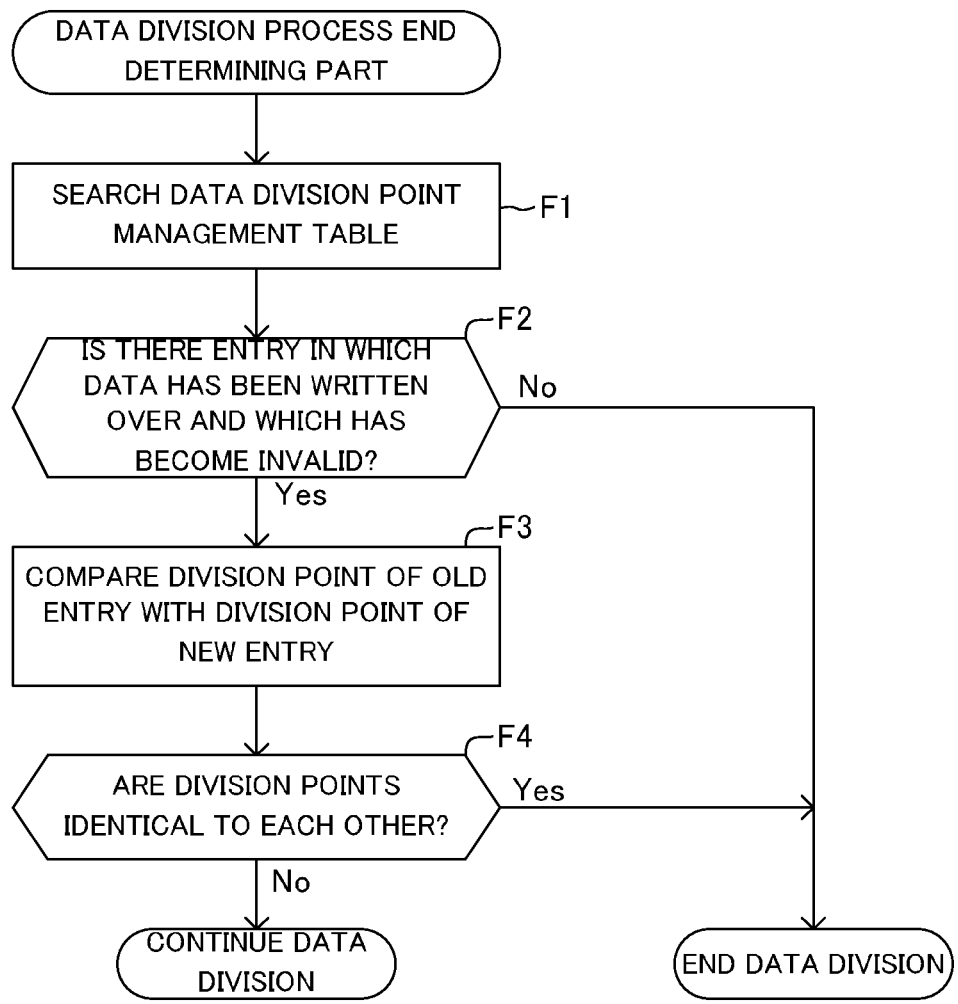
FIG. 19 is a flowchart showing an operation of the data writing process in the storage system disclosed in FIG. 5.

FIG. 19 shows an operation of the data division process end determining part 163 in the inline data division processing part 16. The data division process end determining part 163 searches the data division point management table 171 (step F1), and checks whether redivided new data is registered in step E2 or not, and whether there is an unnecessary entry or not (step F2).

In a case where there is not an unnecessary entry (step F2: No), the data division process end determining part 163 ends division of data. In a case where there is an unnecessary entry (step F2: Yes), the data division process end determining part 163 compares the division point of the old entry with the division point of the new entry (step F3) to determine whether the old entry and the new entry have the same division points or not (step F4). In a case where the division points are identical to each other (step F4: Yes), the data division process end determining part 163 ends division of data. In a case where the division points are different from each other (step F4: No), the data division process end determining part 163 continues division of data.

In this exemplary embodiment, the data division process is ended only when the division point of the old entry and the division point of the new entry are identical to each other. However, it is possible to employ ending the data division process when the finger print value of the division point of the new entry satisfies a given condition, for example, the level of the finger print value of the division point of the new entry is equal to that of the finger print value of the division point of the old entry, by regarding the division point of the new entry as a data division point by compromise even if the division points of the old entry and the new entry are not the same.

Figure 20:
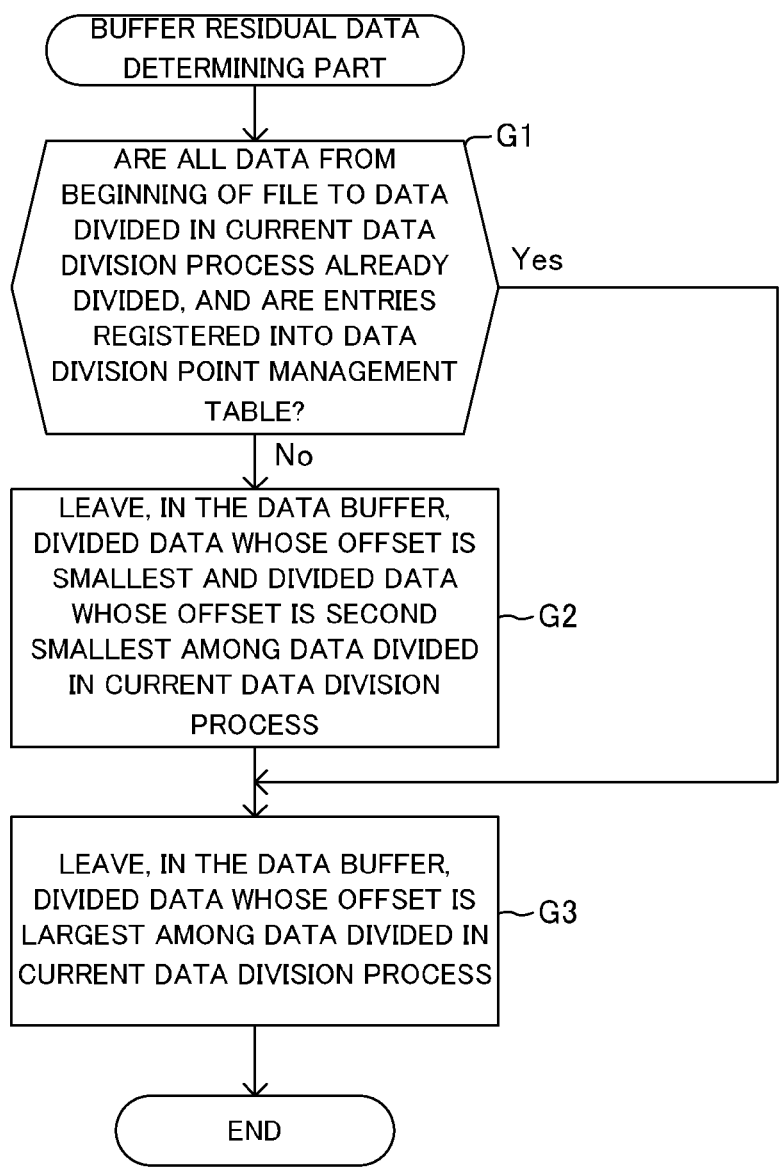
FIG. 20 is a flowchart showing an operation of the data writing process in the storage system disclosed in FIG. 5.

FIG. 20 shows an operation of the buffer residual data determining part 164 in the inline data division processing part 16. The buffer residual data determining part 164 determines whether all data from the beginning of the file to data divided in the current data division process have already been divided and entries have been registered into the data division point management table 171 (step G1).

In a case where all of the data have not been divided (step G1: No), the buffer residual data determining part 164 sets divided data whose offset is the smallest and divided data whose offset is the second smallest among the data divided in the current data division process, as data to be left in the data buffer 15 (step G2). Moreover, regardless of the above result, the buffer residual data determining part 164 sets divided data whose offset is the largest among the data divided in the current data division process, as data to be left in the data buffer 15 (step G3).

Figure 21:
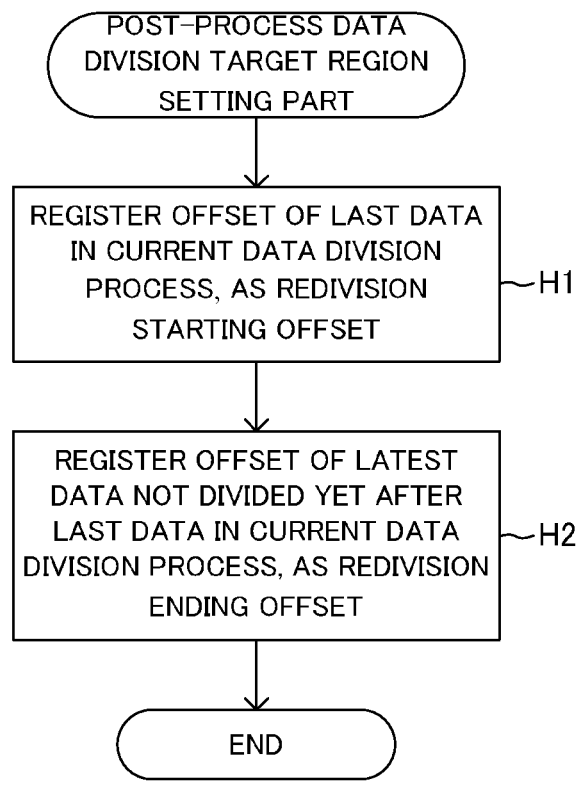
FIG. 21 is a flowchart showing an operation of the data writing process in the storage system disclosed in FIG. 5.

FIG. 21 shows an operation of the post-process data division target region setting part 165 in the inline data division processing part 16. The post-process data division target region setting part 165 registers the offset of the last data in the current data division process as a redivision starting offset (step H1). Then, the post-process data division target region setting part 165 registers the offset of the latest data having not been divided yet after the last data in the current data division process, as a redivision ending offset (step H2).

Figure 22:
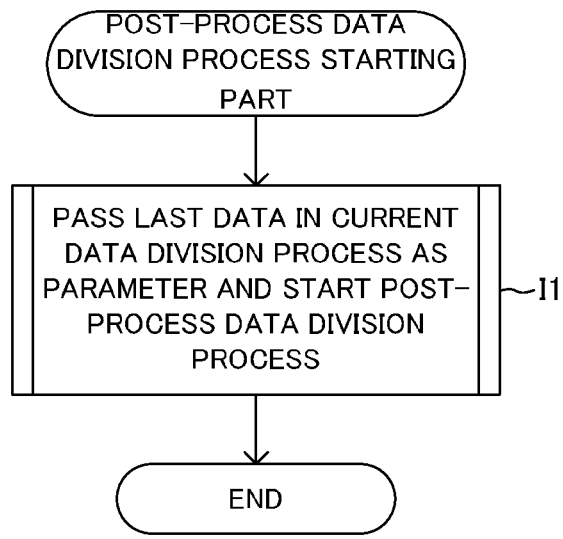
FIG. 22 is a flowchart showing an operation of the data writing process in the storage system disclosed in FIG. 5.

FIG. 22 shows an operation of the post-process data division process starting part 166 in the inline data division processing part 16. The post-process data division process starting part 166 passes the last data in the current data division process as a parameter to start a post-process data division process (step 11).

Figure 23:
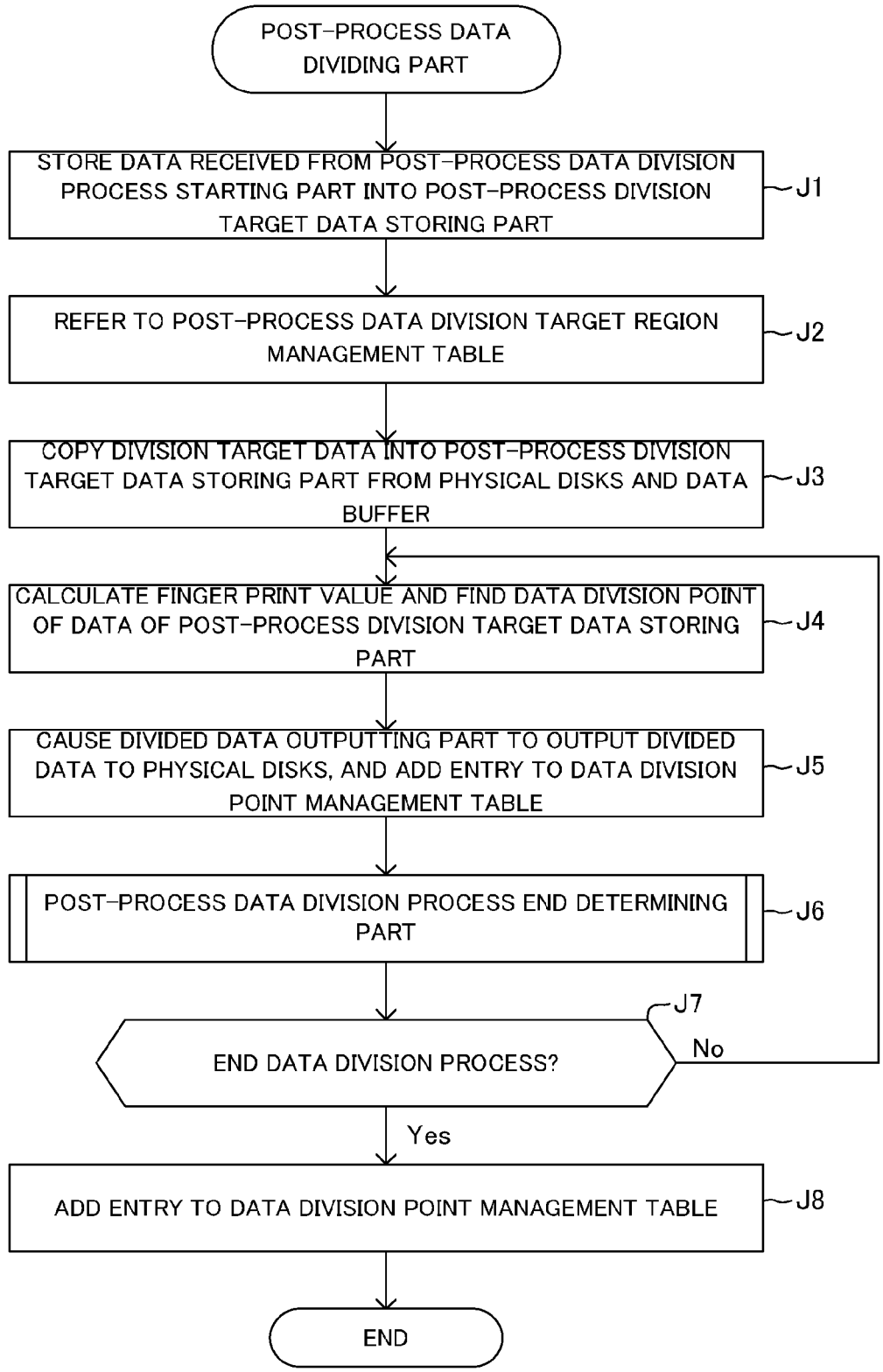
FIG. 23 is a flowchart showing an operation of the data writing process in the storage system disclosed in FIG. 5.

FIG. 23 shows an operation of the post-process data dividing part 191 in the post-process data division processing part 19. The post-process data dividing part 191 stores data received from the post-process data division process starting part 166 into the post-process division target data storing part 21 (step J1).

Next, the post-process data dividing part 191 refers to the post-process data division target region management table 201 in the post-process data division target region information storing part 20 (step J2), and copies division target data into the post-process division target data storing part 21 from the physical disks and the data buffer (step J3).

An example of the post-process data division target region management table 201 is shown in FIG. 8. The contents of data in the post-process data division target management table 201 are as described below:
 file name: the name of a file to be redivided in a post process
 redivision starting offset: the file offset of data where redivision is started in the post process
 redivision ending offset: the file offset of data where redivision is ended in the post process.

Next, the post-process data dividing part 191 calculates a finger print value to find a data division point of data of the post-process division target data storing part 21 (step J4), and divides the data. Then, the post-process data dividing part 191 causes the divided data outputting part 162 to output the divided data to the physical disks 23, and adds an entry to the data division point management table 171 (step J5). Moreover, the post-process data dividing part 191 calls the post-process data division process end determining part 192 (step J6) to determine whether to end the post-process data division process (step J7).

Then, in the case of ending the post-process data division process (step J7: Yes), the post-process data dividing part 191 deletes the entry of old data that is not unnecessary because new data is registered, from the data division point management table 171 (step J8), and ends the process. If not ending the post-process data division process (step J7: No), the post-process data dividing part 191 repeats the process from step J4.

Figure 24:
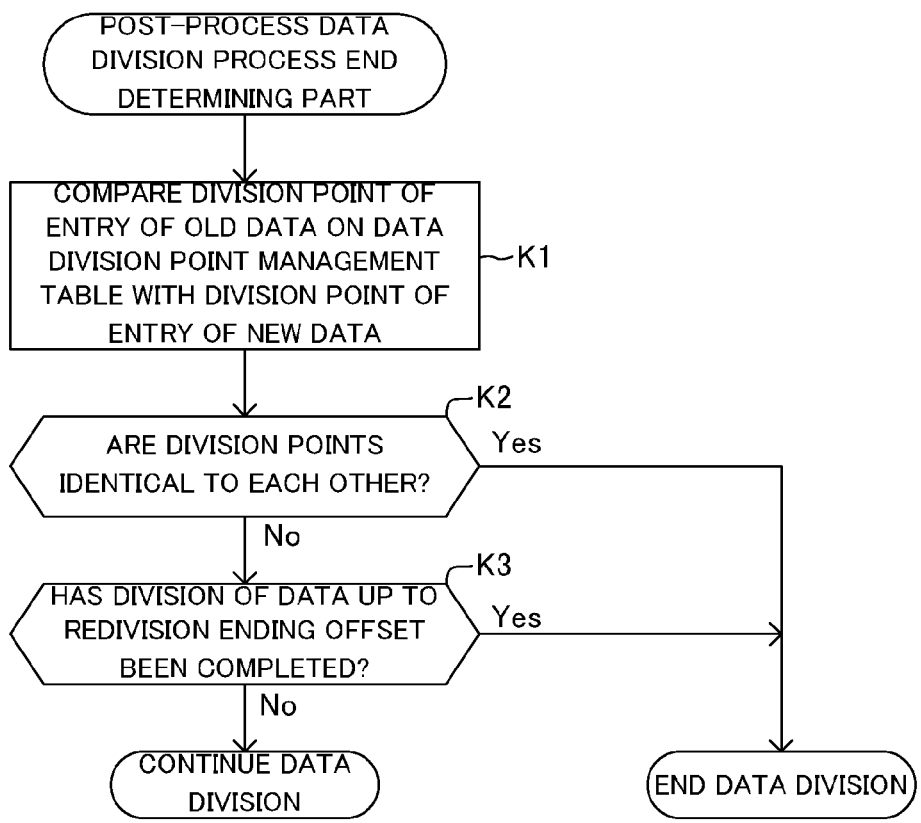
FIG. 24 is a flowchart showing an operation of the data writing process in the storage system disclosed in FIG. 5.

FIG. 24 shows an operation of the post-process data division process end determining part 192 in the post-process data division processing part 19. The post-process data division process end determining part 192 compares the division point of the entry of the old data in the data division point management table 171 with the division point of the entry of the new data redivided in the post-process data division process (step K1), and determines whether the division points are identical to each other or not (step K2).

In a case where the division points of the entries of the old data and the new data are identical to each other (step K2: Yes), the post-process data division process end determining part 192 ends the post-process data division process. In a case where the division points of the entries of the old data and the new data are different from each other (step K2: No), the post-process data division process end determining part 192 continues the post-process data division process. To be specific, in a case where the division points of the entries of the old data and the new data are different from each other, the post-process data division process end determining part 192 determines whether redivision of data up to the redivision ending offset in the post-process data division target region management table 201 is completed or not (step K3). In a case where redivision of data up to the redivision ending offset is completed (step K3: Yes), the post-process data division process end determining part 192 ends the post-process data division process. In a case where redivision of data up to the redivision ending offset is not completed (step K3: No), the post-process data division process end determining part 192 continues the post-process data division process.

Figure 25:
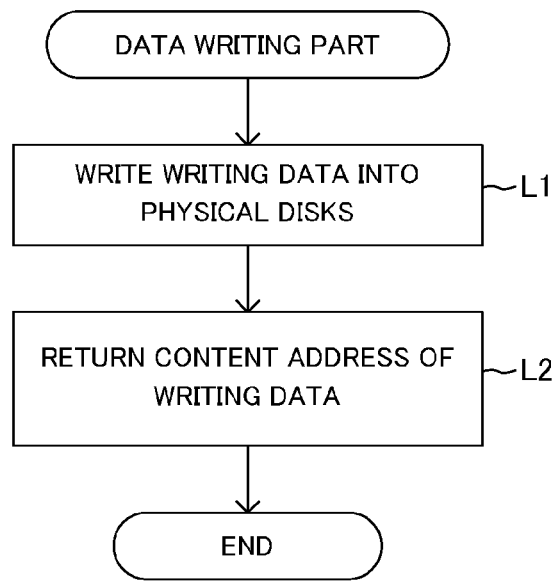
FIG. 25 is a flowchart showing an operation of the data writing process in the storage system disclosed in FIG. 5.

FIG. 25 shows an operation of the data writing part 221 in the disk input/output controlling part 22. The data writing part 221 stores writing data into the physical disks (step L1), and returns the content address of the writing data (step L2).

Figure 26:
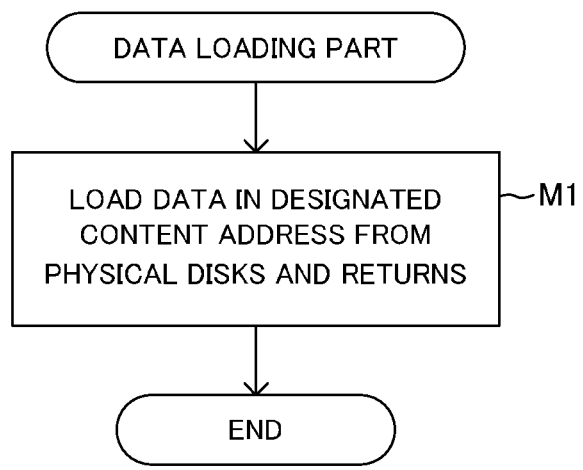
FIG. 26 is a flowchart showing an operation of the data writing process in the storage system disclosed in FIG. 5.

FIG. 26 shows an operation of the data loading part 222 in the disk input/output controlling part 22. The data loading part 222 loads data in a designated content address from the physical disks and returns (step MO.

As described above, according to the storage system 1 of this exemplary embodiment, even if a commit occurs during data backup in a storage system that performs variable length division of data by the inline method based on the content of data, for example, by using a finger print and executes deduplication of data, it is possible to minimize an effect on the performance and restrict decrease of the rate of deduplication of the storage. This is because, by leaving, in the data buffer, indispensable information necessary for redividing data including data of a part already written in the disks at the time of commit, it is possible to redivide the data into optimum data for deduplication without cost when receiving continuing data after commit <Supplementary Notes>

The whole or part of the exemplary embodiments disclosed above can be described as the following supplementary notes. Below, a schematic configuration of a storage system (see FIG. 27), a program, and a data storing method according to the present invention will be described. However, the present invention is not limited to the following configuration.

(Supplementary Note 1)

A storage system 300 comprising:

a data buffer 311 configured to receive input of data to be stored of a predetermined volume and store the data temporarily;

a dividing unit 312 configured to generate divided data by dividing the data inputted into the data buffer; and a storage processing unit 313 configured to store the divided data obtained by division by the dividing unit into a storage device 320 and, when storing other divided data of a content identical to that of the divided data already stored in the storage device into the storage device, eliminate duplicate storage by reference of the divided data already stored in the storage device as the other divided data, wherein the dividing unit 312 is configured to, at preset timing, generate the divided data by dividing the data inputted into the data buffer by a preset division standard based on a content of the data, and also divide, by the division standard, connected data that residual data and continuing data are connected in the data buffer, the residual data being left without being divided by the division standard, and the continuing data continuing to the residual data and being inputted in the data buffer.

(Supplementary Note 2)

The storage system according to Supplementary Note 1, wherein the dividing unit is configured to, at timing of reception of input of a present writing command, divide the data inputted into the data buffer by the division standard to thereby generate the divided data divided by the division standard and the residual data left without being divided by the division standard, and also divide, by the division standard, the connected data that the continuing data inputted into the data buffer after generation of the above data and the residual data are connected in the data buffer.

(Supplementary Note 3)

The storage system according to Supplementary Note 2, wherein:

the storage processing unit is configured to, at timing of reception of input of the writing command, execute a process of storing the divided and the residual data both generated by the dividing unit into the storage device; and the dividing unit is configured to input the residual data stored in the storage device into the data buffer and divide, by the division standard, the connected data that the residual data and the continuing data both inputted in the data buffer are connected in the data buffer.

(Supplementary Note 4)

The storage system according to Supplementary Note 2 or 3, wherein the dividing unit is configured to divide the connected data that the continuing data continuing to a rear end of the residual data and the residual data are connected in the data buffer, by the division standard.

(Supplementary Note 5)

The storage system according to Supplementary Note 2 or 3 wherein the dividing unit is configured to divide the connected data that the continuing data continuing to a front end of the residual data and the residual data are connected in the data buffer, by the division standard.

(Supplementary Note 6)

The storage system according to any of Supplementary Notes 2 to 5, wherein:

the data buffer is configured to temporarily store at least two data groups inputted into the data buffer in a mutually separated state; and the dividing unit is configured to divide, by the division standard, the connected data that the continuing data and first and second residual data are connected in the data buffer, the continuing data continuing to a rear end of the first residual data that is the residual data located on a rear side of a first one of the data groups and left without being divided by the division standard and also continuing to a front end of the second residual data that is the residual data located on a front side of a second one of the data groups and left without being divided by the division standard.

(Supplementary Note 7)

A non-transitory computer-readable medium storing a program comprising instructions for causing a storage device, which includes a data buffer configured to receive input of data to be stored of a predetermined volume and store the data temporarily, to realize:

a dividing unit configured to generate divided data by dividing the data inputted into the data buffer; and a storage processing unit configured to store the divided data obtained by division by the dividing unit into a storage device and, when storing other divided data of a content identical to that of the divided data already stored in the storage device into the storage device, eliminate duplicate storage by reference of the divided data already stored in the storage device as the other divided data, the program also comprising instructions for causing the storage device to realize that the dividing unit is configured to, at preset timing, generate the divided data by dividing the data inputted into the data buffer by a preset division standard based on a content of the data, and also divide, by the division standard, connected data that residual data and continuing data are connected in the data buffer, the residual data being left without being divided by the division standard, and the continuing data continuing to the residual data and being inputted in the data buffer.

(Supplementary Note 8)

The non-transitory computer-readable medium storing the program according to Supplementary Note 7, wherein the dividing unit is configured to, at timing of reception of input of a present writing command, divide the data inputted into the data buffer by the division standard to thereby generate the divided data divided by the division standard and the residual data left without being divided by the division standard, and also divide, by the division standard, the connected data that the continuing data inputted into the data buffer after generation of the above data and the residual data are connected in the data buffer.

(Supplementary Note 9)

A data storage method comprising:

by a storage device including a data buffer configured to receive input of data to be stored of a predetermined volume and store the data temporarily:

executing a division process of generating divided data by dividing the data inputted into the data buffer; and storing the divided data into a storage device and, when storing other divided data of a content identical to that of the divided data already stored in the storage device into the storage device, eliminating duplicate storage by reference of the divided data already stored in the storage device as the other divided data, wherein the division process is executed to, at preset timing, generate the divided data by dividing the data inputted into the data buffer by a preset division standard based on a content of the data, and also divide, by the division standard, connected data that residual data and continuing data are connected in the data buffer, the residual data being left without being divided by the division standard, and the continuing data continuing to the residual data and being inputted in the data buffer.

(Supplementary Note 10)

The data storage method according to Supplementary Note 9, wherein the division process is executed to, at timing of reception of input of a present writing command, divide the data inputted into the data buffer by the division standard to thereby generate the divided data divided by the division standard and the residual data left without being divided by the division standard, and also divide, by the division standard, the connected data that the continuing data inputted into the data buffer after generation of the above data and the residual data are connected in the data buffer.

The abovementioned program is stored in the storage device, or recorded on a computer-readable recording medium. For example, the recording medium is a portable medium such as a flexible disk, an optical disk, a magneto-optical disk, and a semiconductor memory.

Although the present invention is described above by referring to the exemplary embodiments, the present invention is not limited to the exemplary embodiments above. The configurations and details of the present invention can be modified in various manners that can be understood by one skilled in the art within the scope of the present invention.

The invention claimed is:

1. A storage system comprising:
a data buffer configured to receive input of data to be stored of a predetermined volume and store the data temporarily;
a dividing unit configured to generate divided data by dividing the data inputted into the data buffer; and
a storage processing unit configured to store the divided data obtained by division by the dividing unit into a storage device and, when storing other divided data of a content identical to that of the divided data already stored in the storage device into the storage device, eliminate duplicate storage by reference of the divided data already stored in the storage device as the other divided data,
wherein the dividing unit is configured to, at preset timing, generate the divided data by dividing the data inputted into the data buffer by a preset division standard based on a content of the data, and also divide, by the division standard, connected data that residual data and continuing data are connected in the data buffer, the residual data being left without being divided by the division standard, and the continuing data continuing to the residual data and being inputted in the data buffer,
wherein the dividing unit is configured to, at timing of reception of input of a present writing command, divide the data inputted into the data buffer by the division standard to thereby generate the divided data divided by the division standard and the residual data left without being divided by the division standard, and also divide, by the division standard, the connected data that the continuing data inputted into the data buffer after generation of the above data and the residual data are connected in the data buffer,
wherein the storage processing unit is configured to, at timing of reception of input of the writing command, execute a process of storing the divided and the residual data both generated by the dividing unit into the storage device,
and wherein the dividing unit is configured to input the residual data stored in the storage device into the data buffer and divide, by the division standard, the connected data that the residual data and the continuing data both inputted in the data buffer are connected in the data buffer.

2. The storage system according to claim 1, wherein the dividing unit is configured to divide the connected data that the continuing data continuing to a rear end of the residual data and the residual data are connected in the data buffer, by the division standard.

3. The storage system according to claim 1, wherein the dividing unit is configured to divide the connected data that the continuing data continuing to a front end of the residual data and the residual data are connected in the data buffer, by the division standard.

4. The storage system according to claim 1, wherein:
the data buffer is configured to temporarily store at least two data groups inputted into the data buffer in a mutually separated state; and
the dividing unit is configured to divide, by the division standard, the connected data that the continuing data and first and second residual data are connected in the data buffer, the continuing data continuing to a rear end of the first residual data that is the residual data located on a rear side of a first one of the data groups and left without being divided by the division standard and also continuing to a front end of the second residual data that is the residual data located on a front side of a second one of the data groups and left without being divided by the division standard.

5. A non-transitory computer-readable medium storing a program comprising instructions for causing a storage device, which includes a data buffer configured to receive input of data to be stored of a predetermined volume and store the data temporarily, to realize:
a dividing unit configured to generate divided data by dividing the data inputted into the data buffer; and
a storage processing unit configured to store the divided data obtained by division by the dividing unit into a storage device and, when storing other divided data of a content identical to that of the divided data already stored in the storage device into the storage device, eliminate duplicate storage by reference of the divided data already stored in the storage device as the other divided data,
the program also comprising instructions for causing the storage device to realize that the dividing unit is configured to, at preset timing, generate the divided data by dividing the data inputted into the data buffer by a preset division standard based on a content of the data, and also divide, by the division standard, connected data that residual data and continuing data are connected in the data buffer, the residual data being left without being divided by the division standard, and the continuing data continuing to the residual data and being inputted in the data buffer,
wherein the dividing unit is configured to, at timing of reception of input of a present writing command, divide the data inputted into the data buffer by the division standard to thereby generate the divided data divided by the division standard and the residual data left without being divided by the division standard, and also divide, by the division standard, the connected data that the continuing data inputted into the data buffer after generation of the above data and the residual data are connected in the data buffer,
wherein the storage processing unit is configured to, at timing of reception of input of the writing command, execute a process of storing the divided and the residual data both generated by the dividing unit into the storage device,
and wherein the dividing unit is configured to input the residual data stored in the storage device into the data buffer and divide, by the division standard, the connected data that the residual data and the continuing data both inputted in the data buffer are connected in the data buffer.

6. A data storage method comprising:
by a storage device including a data buffer configured to receive input of data to be stored of a predetermined volume and store the data temporarily:
executing a division process of generating divided data by dividing the data inputted into the data buffer; and
executing a storing process of storing the divided data into a storage device and, when storing other divided data of a content identical to that of the divided data already stored in the storage device into the storage device, eliminating duplicate storage by reference of the divided data already stored in the storage device as the other divided data,
wherein the division process is executed to, at preset timing, generate the divided data by dividing the data inputted into the data buffer by a preset division standard based on a content of the data, and also divide, by the division standard, connected data that residual data and continuing data are connected in the data buffer, the residual data being left without being divided by the division standard, and the continuing data continuing to the residual data and being inputted in the data buffer,
wherein the division process is executed to, at timing of reception of input of a present writing command, divide the data inputted into the data buffer by the division standard to thereby generate the divided data divided by the division standard and the residual data left without being divided by the division standard, and also divide, by the division standard, the connected data that the continuing data inputted into the data buffer after generation of the above data and the residual data are connected in the data buffer,
wherein the storing process is executed to, at timing of reception of input of the writing command, store the divided and the residual data both generated by the dividing process into the storage device,
and wherein the dividing process is configured to input the residual data stored in the storage device into the data buffer and divide, by the division standard, the connected data that the residual data and the continuing data both inputted in the data buffer are connected in the data buffer.

* * * * *